United States Patent
Tanaka

(10) Patent No.: US 11,210,822 B2
(45) Date of Patent: Dec. 28, 2021

(54) DISPLAY APPARATUS, DISPLAY METHOD, AND STORAGE MEDIUM FOR DISPLAYING DISTINCT DISPLAY OF RELATIVE POSITION OF SPECIFIC POINT TO THREE-DIMENSIONAL RANGE IN THREE DIMENSIONAL COORDINATE SYSTEM

(71) Applicant: CASIO COMPUTER CO., LTD., Tokyo (JP)

(72) Inventor: Hirokazu Tanaka, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/537,961

(22) Filed: Aug. 12, 2019

(65) Prior Publication Data

US 2019/0371020 A1 Dec. 5, 2019

Related U.S. Application Data

(63) Continuation of application No. PCT/JP2018/040728, filed on Nov. 1, 2018.

(30) Foreign Application Priority Data

Dec. 22, 2017 (JP) .............................. JP2017-246870

(51) Int. Cl.
G06T 11/20 (2006.01)
G06F 15/02 (2006.01)

(52) U.S. Cl.
CPC ........ *G06T 11/206* (2013.01); *G06F 15/0225* (2013.01)

(58) Field of Classification Search
CPC .................... G06T 11/206; G06F 15/0225
See application file for complete search history.

(56) References Cited

U.S. PATENT DOCUMENTS 7,432,926 B1* 10/2008 Cherkas ................. G06F 17/10
345/440
2004/0223002 A1* 11/2004 Fukaya ................ G06F 1/1626
345/619

(Continued)

FOREIGN PATENT DOCUMENTS

JP 2003-186852 A 7/2003
JP 2003186852 A * 7/2003

(Continued)

OTHER PUBLICATIONS

"Distance from a point to a line", Wikipedia, Mar. 3, 2012, pp. 1-3 (Year: 2012).*

(Continued)

*Primary Examiner* — Terrell M Robinson
(74) *Attorney, Agent, or Firm* — Scully Scott Murphy & Presser

(57) ABSTRACT

Among twelve lines indicating a 3D space (Ad) (X-axis direction lines (Xa)(Xb)(Xc)(Xd), Y-axis direction lines (Ya)(Yb)(Yc)(Yd), Z-axis direction lines (Za)(Zb)(Zc)(Zd)), display colors of red (R), green (G) and blue (B) are allocated to three lines (three-dimensional directions), i.e. an X-axis direction line (Xa), a Y-axis direction line (Ya) and a Z-axis direction line (Za), which have, as starting points, a 3D space minimum point (M) at which each of an X value, a Y value and a Z value becomes minimum, and red gradation display (Rgr), green gradation display (Ggr) and blue gradation display (Bgr) (first origin direction distinct display) are executed such that the colors become darker toward an origin (O) of the 3D space (Ad) and become lighter away from the origin (O).

22 Claims, 12 Drawing Sheets

(56) References Cited

U.S. PATENT DOCUMENTS

| | | | | |
|---|---|---|---|---|
| 2005/0041017 A1* | 2/2005 | de Brebisson | ........ | G06T 11/206 345/169 |
| 2007/0120846 A1* | 5/2007 | Ok | ...................... | G06F 3/04815 345/419 |
| 2008/0218519 A1* | 9/2008 | Coury | .................. | G06T 11/206 345/440 |
| 2011/0227946 A1* | 9/2011 | Yoshizawa | .............. | G06F 15/02 345/636 |
| 2016/0077725 A1* | 3/2016 | Maeda | ................ | G06F 3/04847 715/833 |
| 2018/0144534 A1* | 5/2018 | Lee | ...................... | G06K 9/6218 |

FOREIGN PATENT DOCUMENTS

| | | | |
|---|---|---|---|
| JP | 2003-281102 A | | 10/2003 |
| JP | 2003281102 A | * | 10/2003 |
| JP | 2005-182125 A | | 7/2005 |
| JP | 2011-197984 A | | 10/2011 |

OTHER PUBLICATIONS

"Texas Instrument", "TI-89 Titanium Graphing Calculator Guidebook", Jan. 2011, pp. 1-1009. (Year: 2011).*
"8.14.4 Rotating, Resizing, Stretching, and Skewing 3D Graphs", Nov. 5, 2017, OriginLab, pp. 1-4 (Year: 2017).*
International Search Report dated Feb. 5, 2019, issued in PCT/JP2018/040728.
International Preliminary Report on Patentability dated Jul. 2, 2020 received in International Patent Application No. PCT/JP2018/040728.
"HP Prime Graphing Calculator Quick Start Guide", Oct. 2017, pp. 1-52.
Extended European Search Report dated Dec. 2, 2020 received in European Patent Application No. 18893045.7.
Notice of Reasons for Refusal dated Aug. 17, 2021 received in Japanese Patent Application No. JP 2017-246870 together with an English language translation.

* cited by examiner

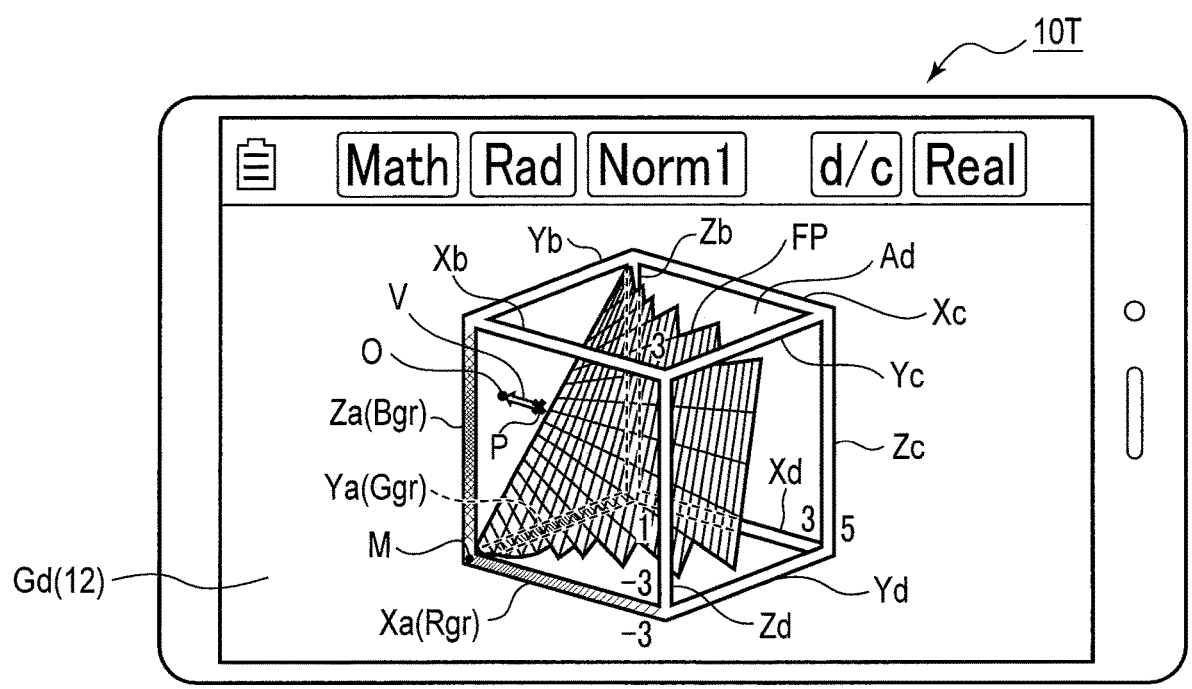
F I G. 1B

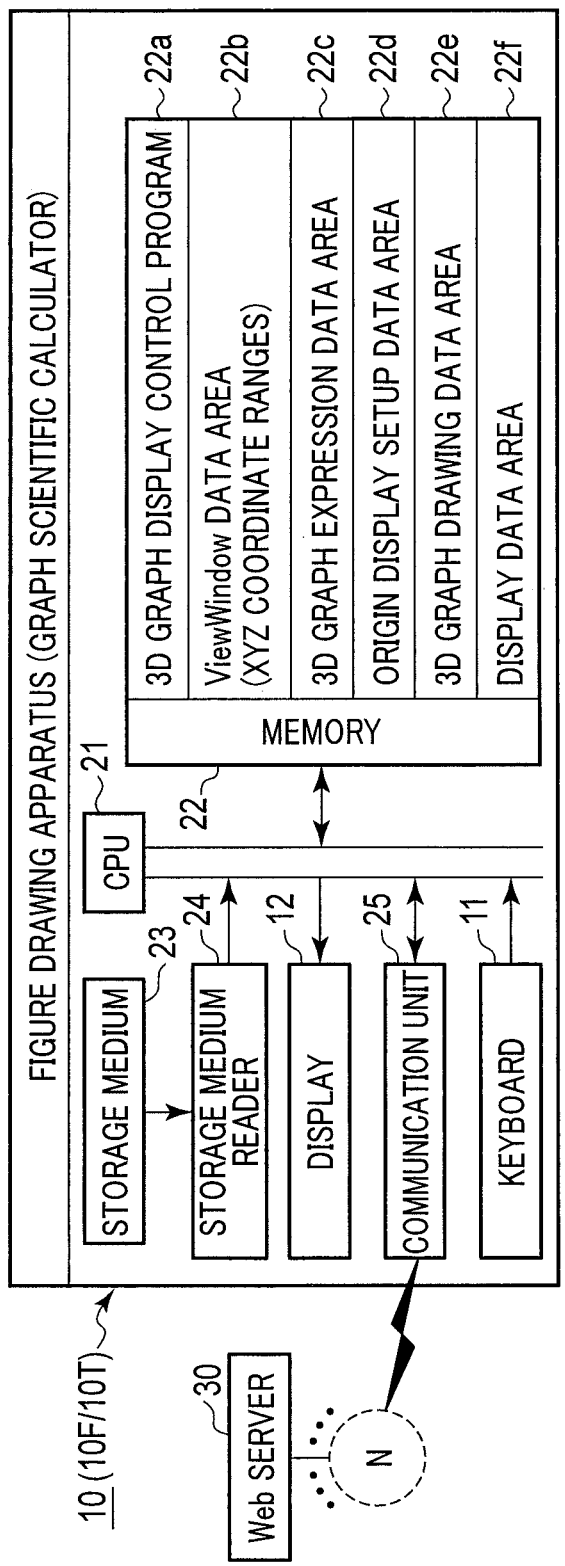
F I G. 2

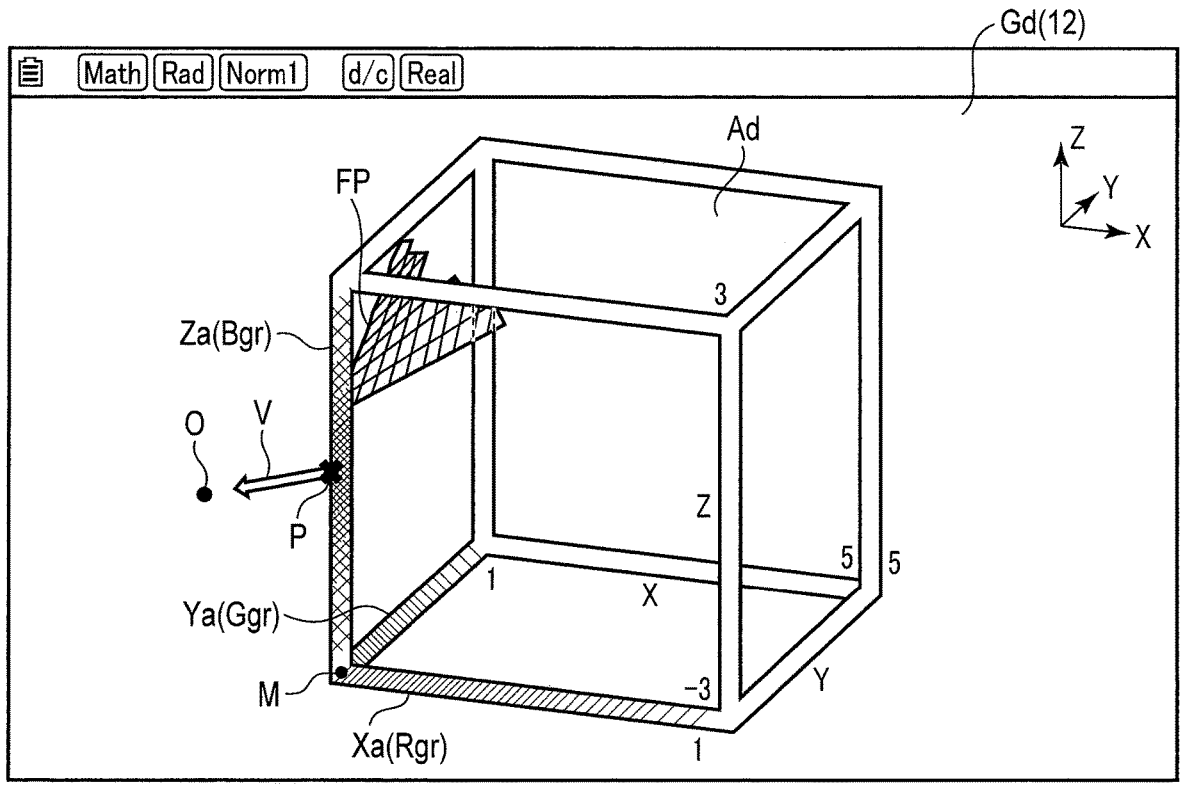
F I G. 8A
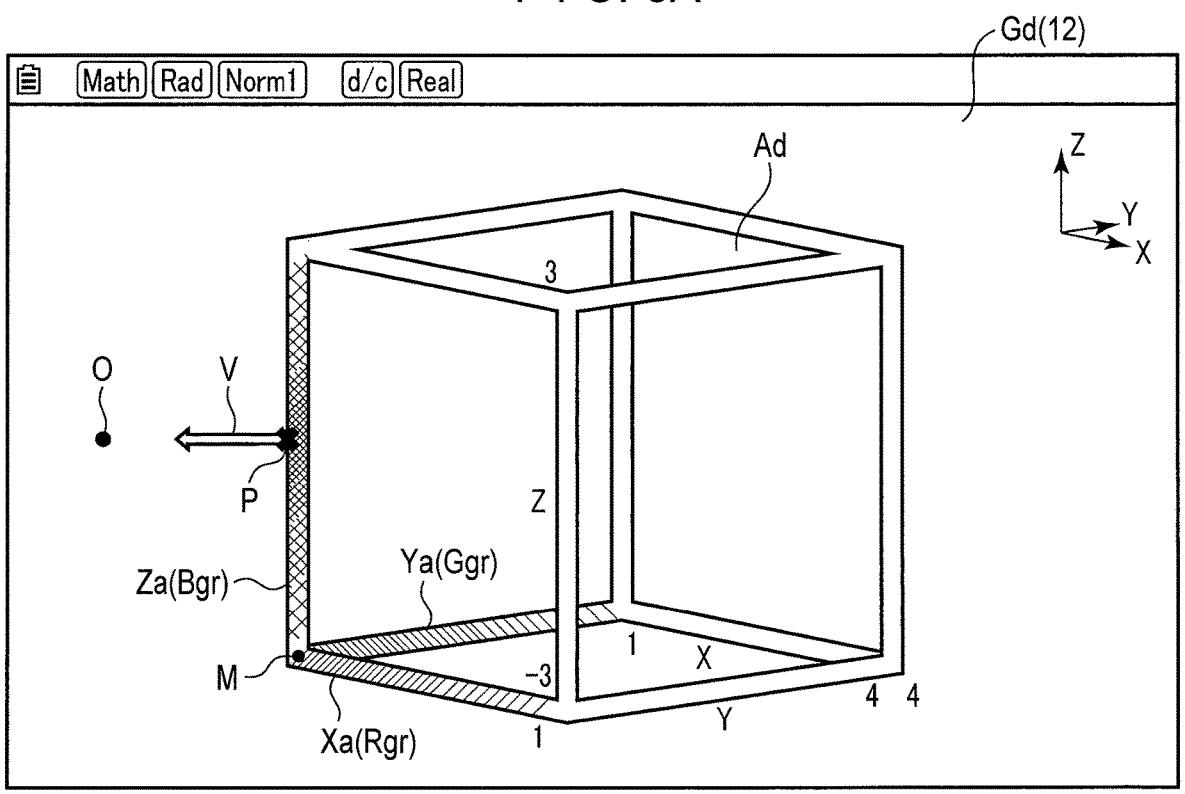
F I G. 8B

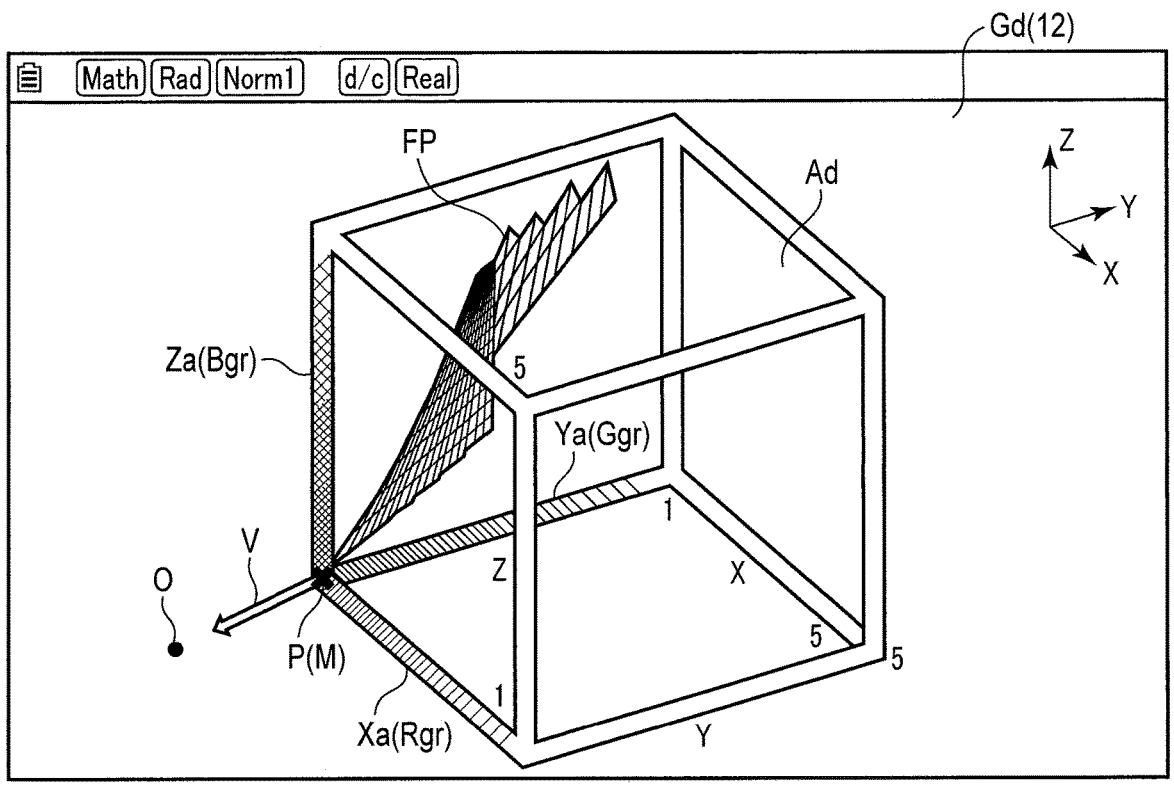
F I G. 9A
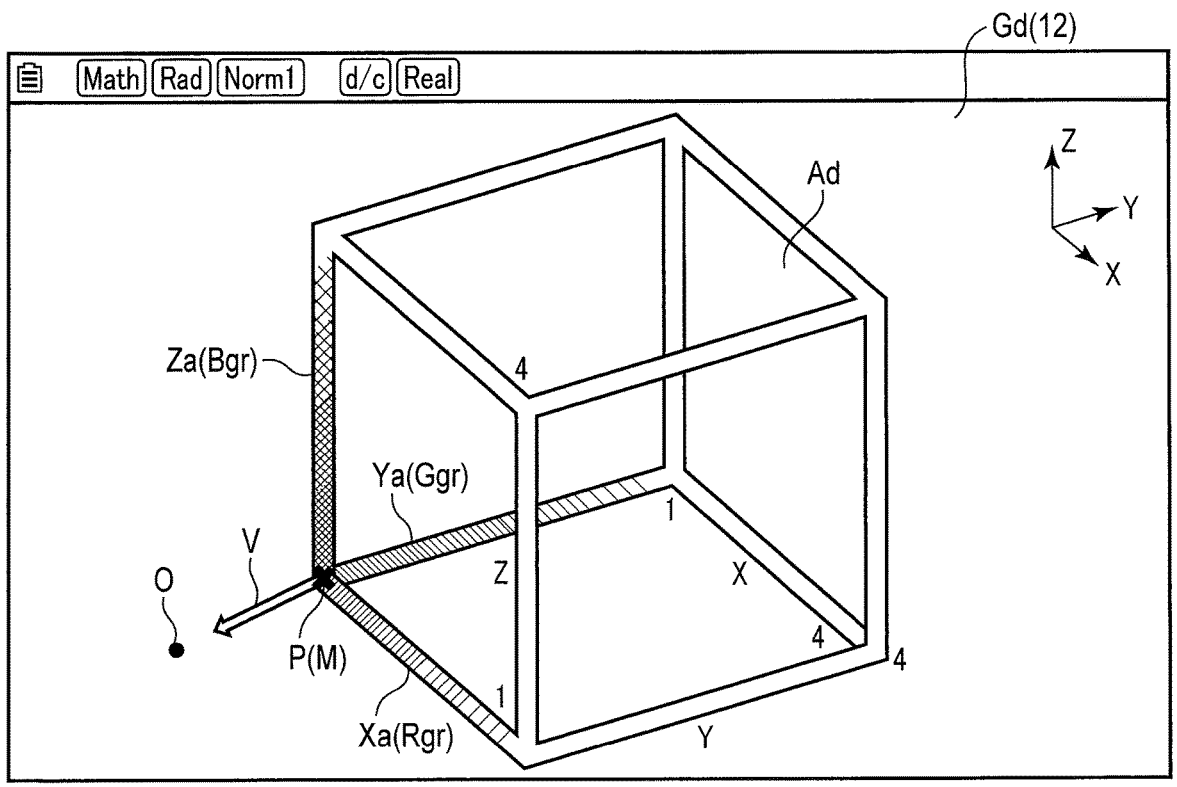
F I G. 9B

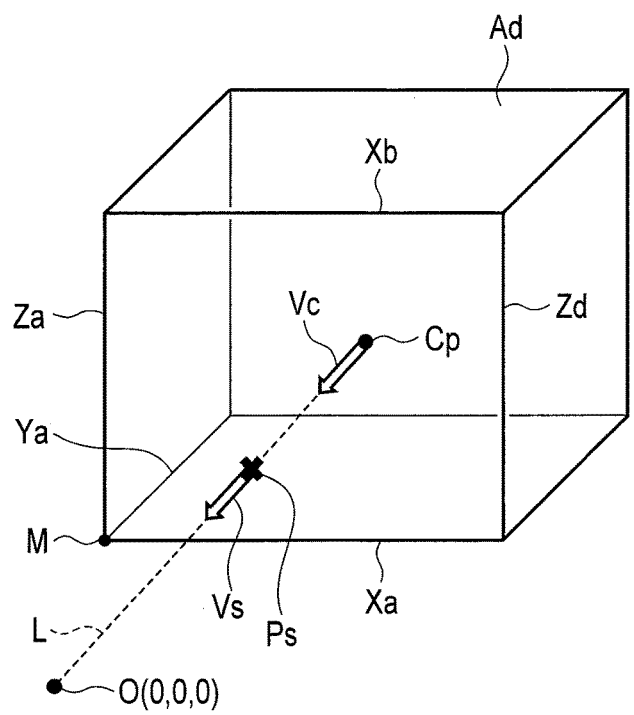
F I G. 14
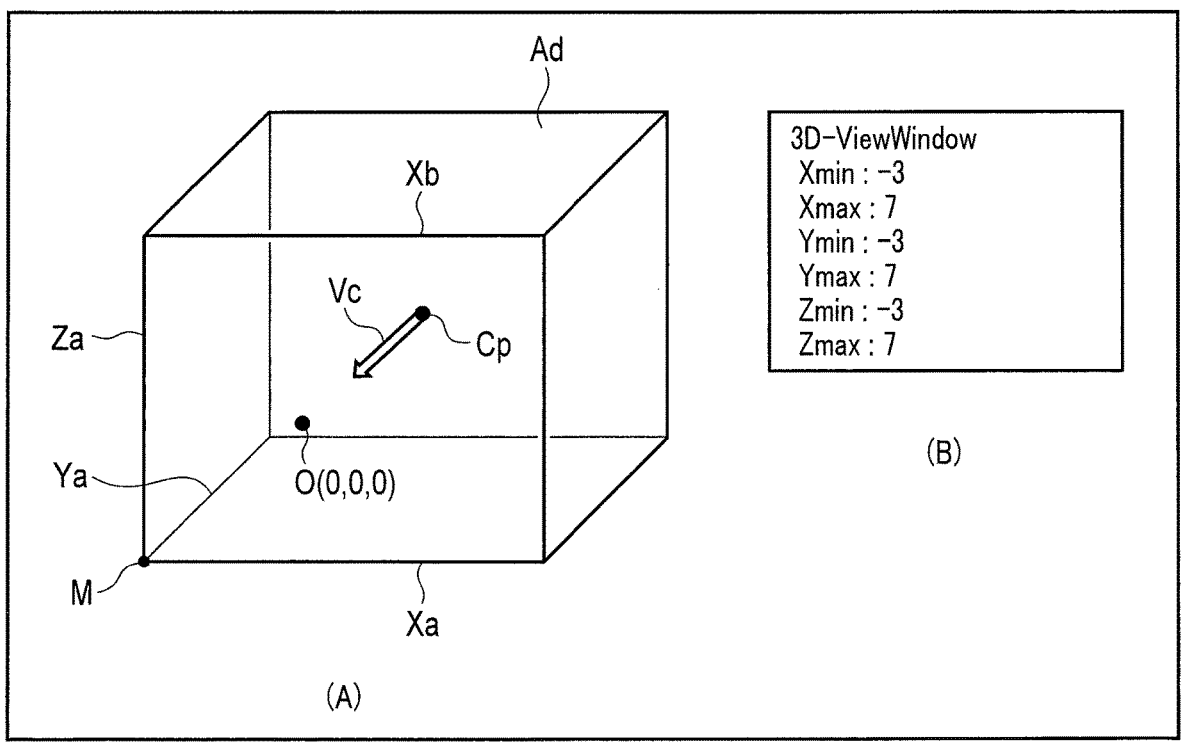
F I G. 15

DISPLAY APPARATUS, DISPLAY METHOD, AND STORAGE MEDIUM FOR DISPLAYING DISTINCT DISPLAY OF RELATIVE POSITION OF SPECIFIC POINT TO THREE-DIMENSIONAL RANGE IN THREE DIMENSIONAL COORDINATE SYSTEM

CROSS-REFERENCE TO RELATED APPLICATIONS

This application is a Continuation Application of PCT Application No. PCT/JP2018/040728, filed Nov. 1, 2018 and based upon and claiming the benefit of priority from Japanese Patent Application No. 2017-246870, filed Dec. 22, 2017, the entire contents of which are incorporated herein by reference.

BACKGROUND OF THE INVENTION

1. Field of the Invention

The present invention relates to a display apparatus for displaying a coordinate system, a display method, and a storage medium thereof.

2. Description of the Related Art

Conventionally, there has been proposed a figure drawing apparatus which draws a solid figure in a XYZ coordinate system (three-dimensional coordinate system) which is set on a screen of a display apparatus (see, e.g., Jpn. Pat. Appln. KOKAI Publication No. 2005-182125).

In the above-described drawing apparatus, for example, in particular, when a specific point (e.g. an origin O (0, 0, 0)) of the XYZ coordinate system (three-dimensional coordinate system), which is set on the screen of a display apparatus, is located within the coordinate range displayed on the screen, but the specific point is remote greatly from the coordinates of the solid figure drawn on the screen or is located outside the coordinate range displayed on the screen, it is difficult for a user to intuitively understand in which direction the specific point is present in relation to the coordinate range displayed on the screen.

SUMMARY OF THE INVENTION

The object of the present invention is to provide a display apparatus which can easily understandably display a relative position of a specific point in a coordinate system to a certain range in the coordinate system.

The display apparatus according to the present invention includes a controller configured to cause a display to effect distinct display corresponding to a relative position of a specific point in a coordinate system, which is specified by at least one axis, in relation to a certain range in the coordinate system, as well as to effect display indicative of the certain range.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1B is a front view illustrating an external configuration of a tablet terminal 10T functioning as the display apparatus 10 according to the embodiment of the present invention.

FIG. 2 is a block diagram illustrating a configuration of electronic circuitry of the display apparatus 10 (10F/10T).

FIG. 8A is a view illustrating a display state of a 3D graph (figure) in a case where the position of the origin O of the 3D space Ad, which is set up according to the 3D graph (figure) drawing process of the display apparatus 10, is located in a side sharing space.

FIG. 8B is a view illustrating a display state of first to third specific point relative position distinct displays in the case where the position of the origin O of the 3D space Ad, which is set up according to the 3D graph (figure) drawing process of the display apparatus 10, is located in the side sharing space.

FIG. 9A is a view illustrating a display state of a 3D graph (figure) in a case where the position of the origin O of the 3D space Ad, which is set up according to the 3D graph (figure) drawing process of the display apparatus 10, is located in a point sharing space.

FIG. 9B is a view illustrating a display state of first to third specific point relative position distinct displays in the case where the position of the origin O of the 3D space Ad, which is set up according to the 3D graph (figure) drawing process of the display apparatus 10, is located in the point sharing space.

FIG. 14 is a view illustrating an example of specific point relative position distinct display with respect to a 3D space Ad corresponding to a 3D graph (figure) drawing function of a second embodiment of the display apparatus 10.

FIG. 15 is a view illustrating an example of specific point relative position distinct display with respect to a 3D space Ad corresponding to a 3D graph (figure) drawing function of a third embodiment of the display apparatus 10.

DETAILED DESCRIPTION OF THE PREFERRED EMBODIMENTS

Hereinafter, embodiments of the present invention will be described with reference to the accompanying drawings.

First Embodiment

Figure 1A:
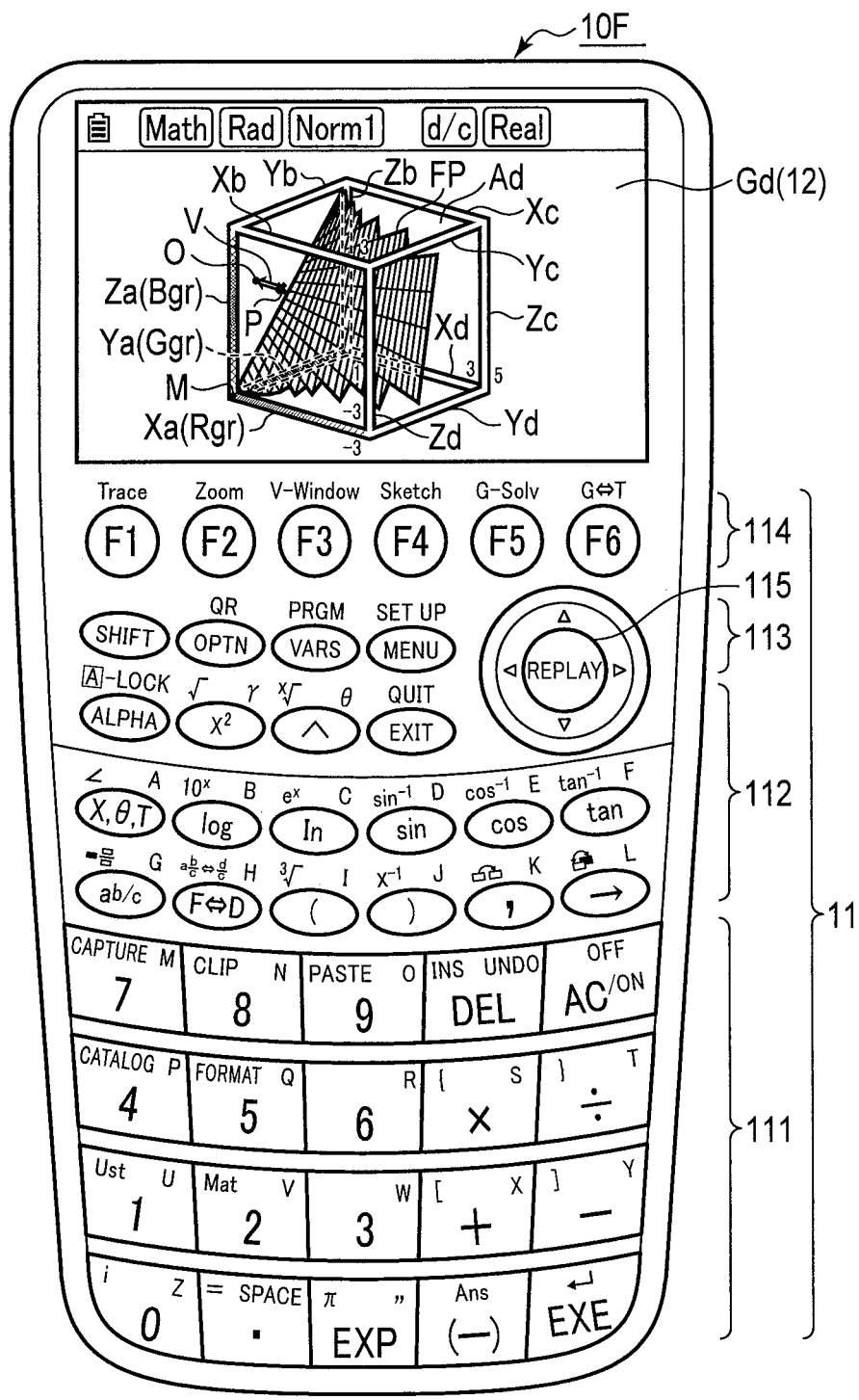
FIG. 1A is a front view illustrating an external configuration of a graph scientific calculator 10F functioning as a display apparatus 10 according to an embodiment of the present invention.

FIG. 1A is a front view illustrating an external configuration of a graph scientific calculator 10F functioning as a display apparatus 10 according to an embodiment of the present invention.

FIG. 1B is a front view illustrating an external configuration of a tablet terminal 10T functioning as the display apparatus 10 according to the embodiment of the present invention.

The display apparatus 10 can be configured as the graph scientific calculator 10F or tablet terminal 10T. In addition, the display apparatus 10 can be configured as a personal computer, a smartphone, a mobile phone, a touch panel-type PDA (personal digital assistants), an electronic book, a portable game console, etc., in which 3D graph (figure) display control programs for drawing figures in a three-dimensional (3D) coordinate system are installed.

Besides, in the display apparatus 10 like the tablet terminal 10T which does not have such physical keys (buttons) as those provided in the graph scientific calculator 10F, a software keyboard simulating the keys of the graph scientific calculator 10F is displayed on a screen of a display 12, and a process is executed in response to an input operation on the software keyboard.

Because of the need for portability, the graph scientific calculator 10F has such a small size that a user can surely hold the calculator 10F by one hand and can perform operations by one hand. A keyboard 11 and display 12 are provided on the front surface of the main body of this graph scientific calculator 10.

The keyboard 11 is provided with a numeric/arithmetic sign key group 111 for inputting numerical values and mathematical expressions and instructing the execution of calculations; a functional-calculation function key group 112 for inputting various functions and activating a memory function; a mode setup key group 113 for displaying menu screens of various operation modes and instructing setup of operation modes; a function key group 114 for activating, by a single key operation, various functions displayed along a lower end of the display screen of the display 12; and a cursor key 115 for performing a moving operation of a cursor displayed on the display 12 and a selection operation of data items.

As the numeric/arithmetic sign key group 111, [0]~[9] (numeric) keys, [+], [−], [×] and [÷] (signs of four rules) keys, an [EXE] (execution) key, an [AC] (clear) key, etc. are arranged.

As the functional-calculation function key group 112, a [log] (logarithm) key, a [sin] (sine) key, a [cos] (cosine) key, a [tan] (tangent) key, etc. are arranged.

As the mode setup key group 113, a [MENU] key, a [SHIFT] key, an [OPTN] (option) key, etc. are arranged.

As the function key group 114, an [F1] key to an [F6] key are arranged.

Besides, when each key of the numeric/arithmetic sign key group 111, functional-calculation function key group 112, mode setup key group 113 and function key group 114 is operated successively after the operation of the [SHIFT] key, this key can function not as the key function described on the key top thereof, but as the function described above this key. For example, if the [AC] key is operated after the operation of the [SHIFT] key (hereinafter referred to as "[SHIFT]+[AC] key"), the [SHIFT]+[AC] key functions as an [OFF] (power off) key. The [SHIFT]+[MENU] key functions as a [SET UP] (setup) key. The [SHIFT]+[F3] key functions as a [V-Window] (View Window) key.

The display 12 of the graph scientific calculator 10F is composed of a dot-matrix type liquid crystal display unit, and is not configured to be capable of accepting an input operation. The display 12 of the tablet terminal 10T is composed such that a touch panel is integrally provided on an outermost surface thereof, and is configured to be capable of accepting an input operation.

Each of FIG. 1A and FIG. 1B illustrates a state in which, in a 3D space (View Window) Ad (here, Xmin~Xmax: 1~5, Ymin~Ymax: −3~3, Zmin~Zmax: −3~3) that is a 3D coordinate system set up on the screen of the display 12, when a mathematical expression, the input of which was accepted, is "Z=XY", a 3D graph FP corresponding to the mathematical expression is drawn and displayed on a 3D graph screen Gd of the display 12.

In the coordinates (Xmin~Xmax: 1~5, Ymin~Ymax: −3~3, Zmin~Zmax: −3~3) that is set up as the 3D space (View Window) Ad, an origin O (0, 0, 0) of the coordinates is located outside the 3D space Ad (here, an outside space (plane sharing space) which shares a plane surrounded by Y-axis direction lines Ya and Yb and Z-axis direction lines Za and Zb which indicate the 3D space Ad).

In the present embodiment, in order to make easily understandable the positional relationship of the origin O to the 3D graph FP, distinct displays described in (1), (2) and (3) below are executed (see FIG. 7A and FIG. 7B).

(1) Among twelve lines indicating the 3D space Ad (X-axis direction lines Xa, Xb, Xc and Xd, Y-axis direction lines Ya, Yb, Yc and Yd, and Z-axis direction lines Za, Zb, Zc and Zd), display colors of red R, green G and blue B are allocated to three lines (three-dimensional directions), i.e. an X-axis direction line Xa, a Y-axis direction line Ya and a Z-axis direction line Za, which have, as starting points, a 3D space minimum point M at which each of the X value, Y value and Z value becomes minimum, and red gradation display Rgr, green gradation display Ggr and blue gradation display Bgr are executed such that the colors become darker toward the origin O and become lighter away from the origin O. Hereinafter, in the present specification, when the four X-axis direction lines, four Y-axis direction lines and four Z-axis direction lines are not distinguished, these lines are referred to as the X-axis direction line X, Y-axis direction line Y and Z-axis direction line Z, respectively.

(2) An origin direction mark P indicative of a position closest to the origin O is displayed in red at a position at which a perpendicular line is dropped from the origin O onto a plane that is shared by the space where the origin O is located and the 3D space Ad (i.e. a plane surrounded by Y-axis direction lines Ya and Yb and Z-axis direction lines Za and Zb). The space in which the origin O is located (a plane sharing space, a line sharing space, a point sharing space) will be described later.

(3) An origin direction arrow V indicative of the direction of the origin O is displayed from the position at which a perpendicular line is dropped from the origin O onto the plane (the plane surrounded by the Y-axis direction lines Ya and Yb and the Z-axis direction lines Za and Zb) shared by the space where the origin O is located.

It is possible to execute only one kind of specific point relative position distinct display, among the first specific point relative position distinct display described in (1) by the gradation displays Rgr, Ggr and Bgr of red, blue and green for the X-axis direction line Xa, Y-axis direction line Ya and Z-axis direction line Za, second specific point relative position distinct display described in (2) by the origin direction mark P, and third specific point relative position distinct display described in (3) by the origin direction arrow V. Alternatively, it is possible to execute the three kinds of specific point relative position distinct display as illustrated in the Figures, or any two kinds of specific point relative position distinct display in combination.

In addition, the origin O may be displayed or may not be displayed. In the three-dimensional coordinate system set up on the screen of the display 12, when the origin O is located outside a coordinate range which is displayable on the 3D graph screen Gd of the display 12, the origin O cannot be displayed.

Thereby, even when the origin O (0, 0, 0) of the 3D space Ad, in which the 3D graph (figure) FP is drawn, is remote to the outside of the 3D space Ad or is remoter to the outside of the 3D graph screen Gd, the user can intuitively understand in which direction the origin O is present in relation to the 3D space Ad that is displayed on the screen.

As illustrated in FIG. 1A, etc., when FIG. 1A, etc. are viewed in the frontal direction, a lower left vertex of the 3D space is the 3D space minimum point M. Even in the case of a similar expression to a general three-dimensional coordinate system, the relative position of the origin O (0, 0, 0) to the 3D space Ad is difficult to understand. However, the relative position of the origin O (0, 0, 0) to the 3D space Ad is more difficult to understand, when the 3D graph (figure) drawing function is designed to be capable of rotating the 3D space Ad in all directions of 360° and when another vertex of the 3D space Ad is the 3D space minimum point M or each plane of the 3D space Ad is inclined. According to the above-described configuration, even in such cases that the relative position of the origin O (0, 0, 0) is difficult to understand, the user can intuitively understand in which direction the origin O is present in relation to the 3D space Ad that is displayed on the screen.

Here, a description will be given of the outline of a 3D graph drawing process in the display apparatus 10 of the present embodiment.

In the 3D graph drawing process of the present embodiment, use is made of a drawing method in which a surface of a 3D graph (figure) is modeled as a set of polygons (grids).

Specifically, in accordance with a mathematical expression for drawing a 3D graph (figure) and the parameters of the mathematical expression, coordinate sequences constituting the surface of the figure that is the target of drawing are arithmetically processed and calculated. Areas (unit drawing areas) of polygons (grids), which are generated by finely dividing an area between the calculated coordinate sequences, are drawn as color-filled areas. Thereby, the 3D graph (figure) is displayed.

FIG. 2 is a block diagram illustrating the configuration of electronic circuitry of the display apparatus 10 (10F/10T).

The electronic circuitry of the display apparatus 10 includes, in addition to the above-described keyboard 11 and display 12, a CPU 21 that is a computer, a memory 22, a storage medium reader 24, and a communication unit 25.

The CPU 21 controls the operations of the respective circuitry components according to a 3D graph (figure) display control program 22a stored in the memory 22, and executes various arithmetic processes corresponding to key input signals from the keyboard 11. This 3D graph display control program 22a may be prestored in the memory 22, or may be stored in the memory 22 by being read in from a storage medium 23 such as a memory card through the storage medium reader 24. The 3D graph display control program 22a is configured to be not rewritable by the user's operation of the keyboard 11.

In the memory 22, an area, which stores data that is rewritable by the user, is secured in addition to the area which stores the information that is not rewritable by the user as described above. This rewritable area stores data of mathematical expressions, table data, graph data, etc., which are constituted by key code data that are successively key-input by the keyboard 11.

In addition, in the area of the memory 14, which stores the rewritable data, a V-Window data area 22b, a 3D graph expression data area 22c, an origin display setup data area 22d, a 3D graph drawing data area 22e and a display data area 22f are secured.

Figure 5:
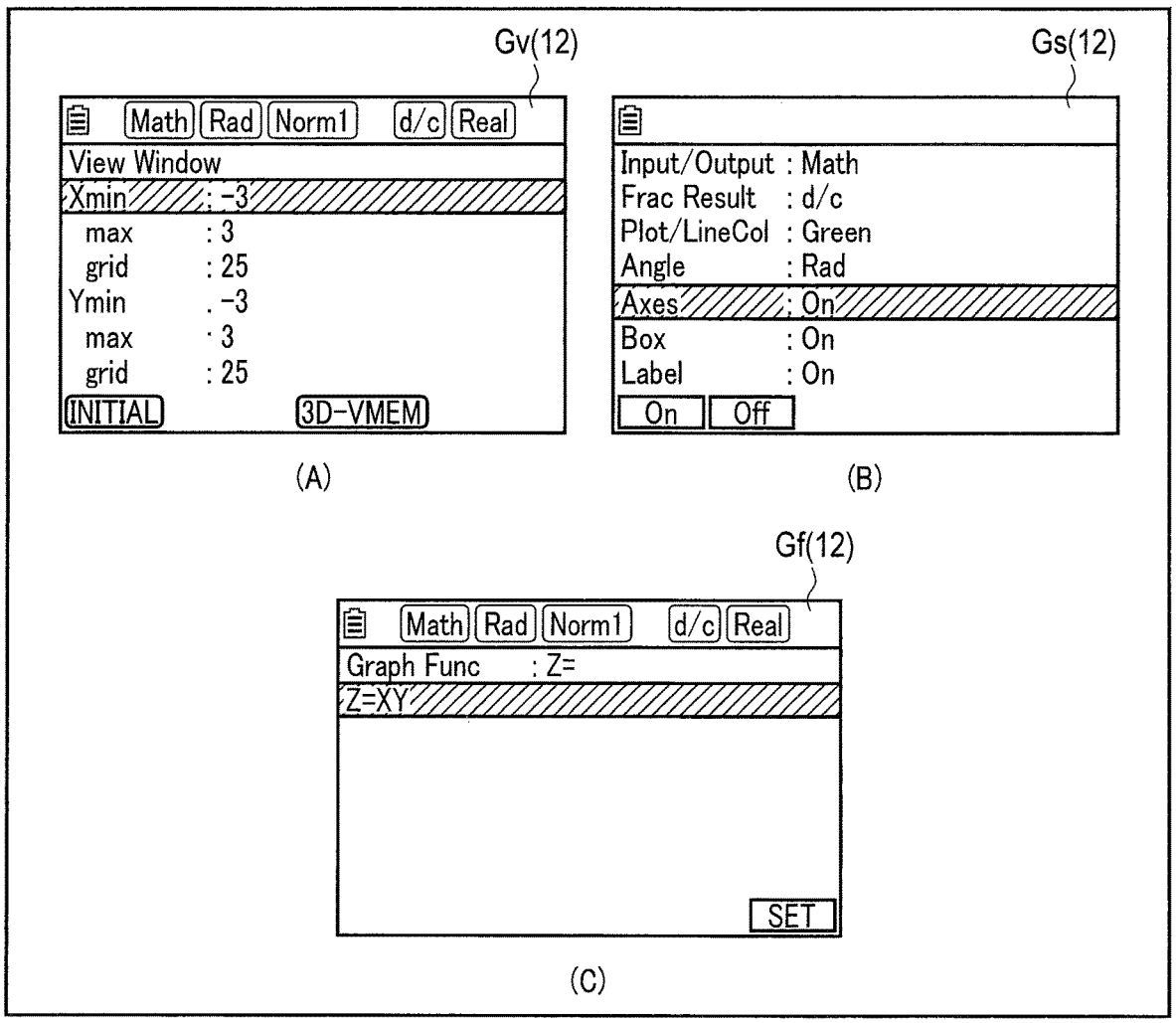
FIG. 5 is a view illustrating examples of (A) a 3D space setup screen Gv, (B) an origin display setup screen Gs, and (C) a 3D graph expression input screen Gf, which are displayed according to the 3D graph (figure) drawing function of the display apparatus 10.

The V-Window data area 22b stores data of a 3D space Ad (Xmin, max/Ymin, max/Zmin, max) for 3D graph (figure) drawing and data of a division number (grid) of grids (polygons), which are input in accordance with user operations (or preset) on a 3D space setup screen Gv (see part (A) of FIG. 5) displayed on the display 12 by operating the [V-Window] (View Window) key.

The 3D graph expression data area 22c stores data of a graph expression and parameters thereof which are input in accordance with user operations on a 3D graph expression input screen Gf (see part (C) of FIG. 5). The 3D graph expression input screen Gf is displayed on the display 12 by selecting an icon [3D-Graph] for drawing a 3D graph (figure) from an operation menu (not shown) that is displayed in accordance with the operation of the above-described [MENU] (menu) key. In the meantime, the graph expression that is input according to the 3D graph expression input screen Gf may be a graph expression which is input by being designated from among a plurality of preset graph expressions by a user operation.

The origin display setup data area 22d stores data for specific point relative position distinct display which is input in accordance with user operations (or preset) on an origin display setup screen Gs (see part (B) of FIG. 5) that is displayed by scrolling the content of the 3D space setup screen (see part (A) of FIG. 5).

In the present embodiment, the data for specific point relative position distinct display includes data for designating the kind of specific point relative position distinct display among the above-described first to third specific point relative position distinct displays, and also includes data for designating display colors for the X-axis direction line Xa, Y-axis direction line Ya and Z-axis direction line Za when the first specific point relative position distinct display is designated.

The 3D graph drawing data area 22e stores drawing data of the 3D graph (figure) (vertex coordinates of each of grids which constitute, by a set of grids (polygons), a surface of the figure), based on the data of the graph expression of the 3D graph (figure) and parameters thereof which are stored in the 3D graph expression data area 22c.

The display data area 22f includes a memory area corresponding to the display size of the liquid crystal display unit that constitutes the display 12. This memory area stores display data, which is to be displayed on the liquid crystal display unit, as bitmap data (here, color bitmap data developed in accordance with the data representing the 3D space Ad, the data representing the specific point relative position distinct display, and the drawing data of the 3D graph (figure)).

Figure 3:
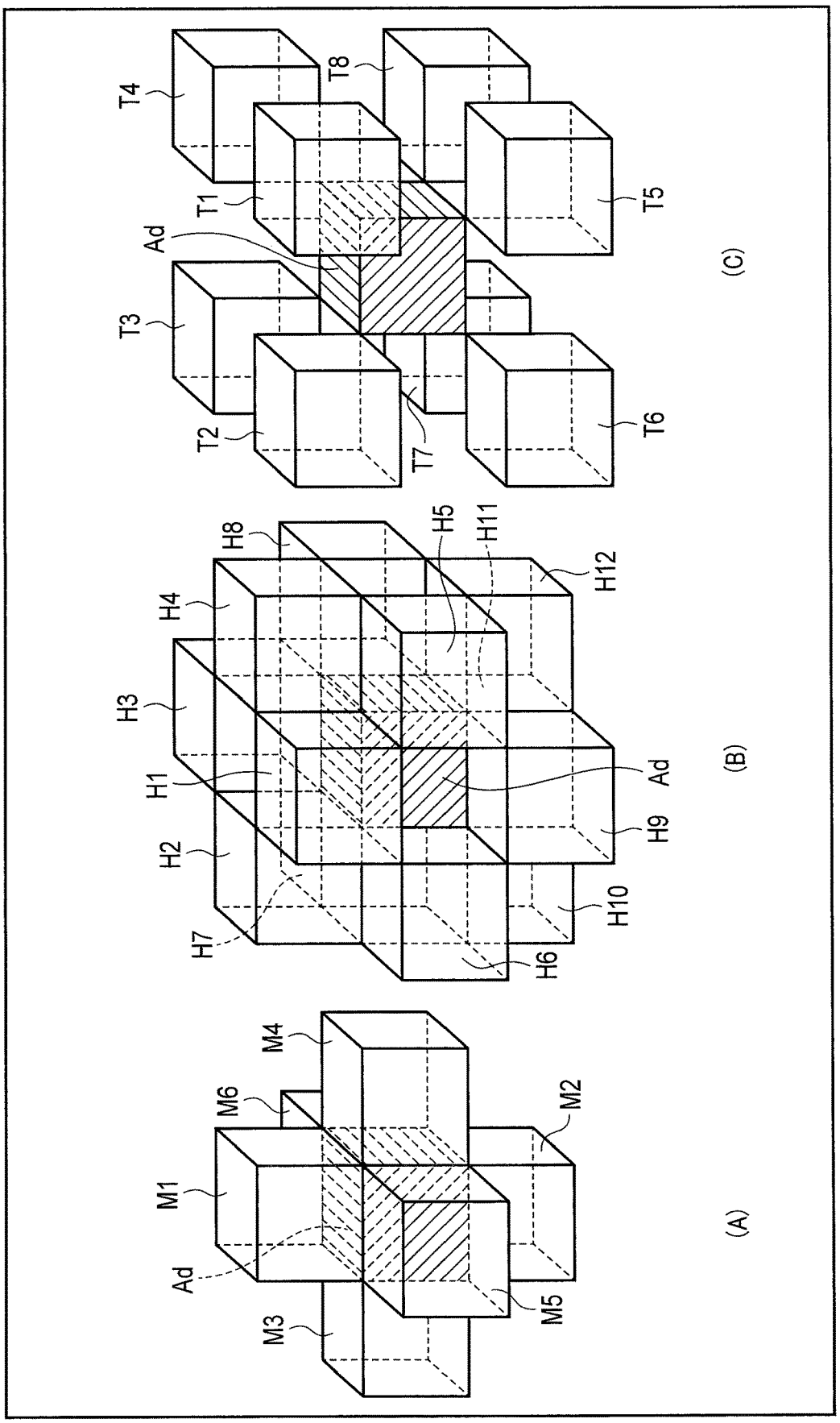
FIG. 3 is a view for describing three patterns (plane sharing/side sharing/point sharing) in cases where an origin O of a 3D space Ad, which is set up by a 3D graph (figure) drawing function of the display apparatus 10, is located outside the 3D space Ad.

FIG. 3 is a view for describing three patterns (plane sharing/side sharing/point sharing) in cases where the origin O of the 3D space Ad, which is set up by the 3D graph (figure) drawing function of the display apparatus 10, is located outside the 3D space Ad.

The space outside the 3D space Ad can be divided into 26 spaces, each of which can be classified, for the purpose of convenience, into any one of the three kinds described below, by six planes including six rectangles (squares) which constitute boundaries of the 3D space Ad that has a parallelepipedic (cubic) shape. When the origin O of the 3D space Ad, which is set up in accordance with the 3D space setup screen (see part (A) of FIG. 5), is present outside the 3D space Ad, the origin O belongs to at least one space of the 26 spaces. Note that in the present specification, each space classified in any one of the three kinds is referred to as "sharing space". In addition, when the origin O belongs to two or more spaces of the 26 spaces, the origin O can be assumed to belong to any one of the two or more spaces.

As illustrated in part (A) of FIG. 3, the sharing spaces of the first kind are plane sharing spaces M1 to M6 in six directions, which share and neighbor the respective planes of the hexahedron that constitutes the 3D space Ad. Hereinafter, in the present specification, a case in which the origin O exists in any one of the plane sharing spaces M1 to M6 is referred to as "plane sharing pattern".

As illustrated in part (B) of FIG. 3, the sharing spaces of the second kind are side sharing spaces H1 to H12 in twelve directions, which share and neighbor the respective sides of the hexahedron that constitutes the 3D space Ad. Hereinafter, in the present specification, a case in which the origin O exists in any one of the side sharing spaces H1 to H12 is referred to as "side sharing pattern".

As illustrated in part (C) of FIG. 3, the sharing spaces of the third kind are point sharing spaces T1 to T8 in eight directions, which share and neighbor the respective vertices of the hexahedron that constitutes the 3D space Ad. Hereinafter, in the present specification, a case in which the origin O exists in any one of the point sharing spaces T1 to T8 is referred to as "point sharing pattern".

The case of the origin O corresponding to the 3D space Ad, which was described with reference to FIG. 1A and FIG. 1B, corresponds to the plane sharing pattern in which the origin O is located in the plane sharing space which shares the plane surrounded by the Y-axis direction lines Ya and Yb and Z-axis direction lines Za and Zb of the 3D space Ad. The first to third specific point relative position distinct displays in the case corresponding to the side sharing pattern and the case corresponding to the point sharing pattern, as well as the case corresponding to the plane sharing pattern, will be described later in the description of the operation of the display apparatus 10.

Figure 4:
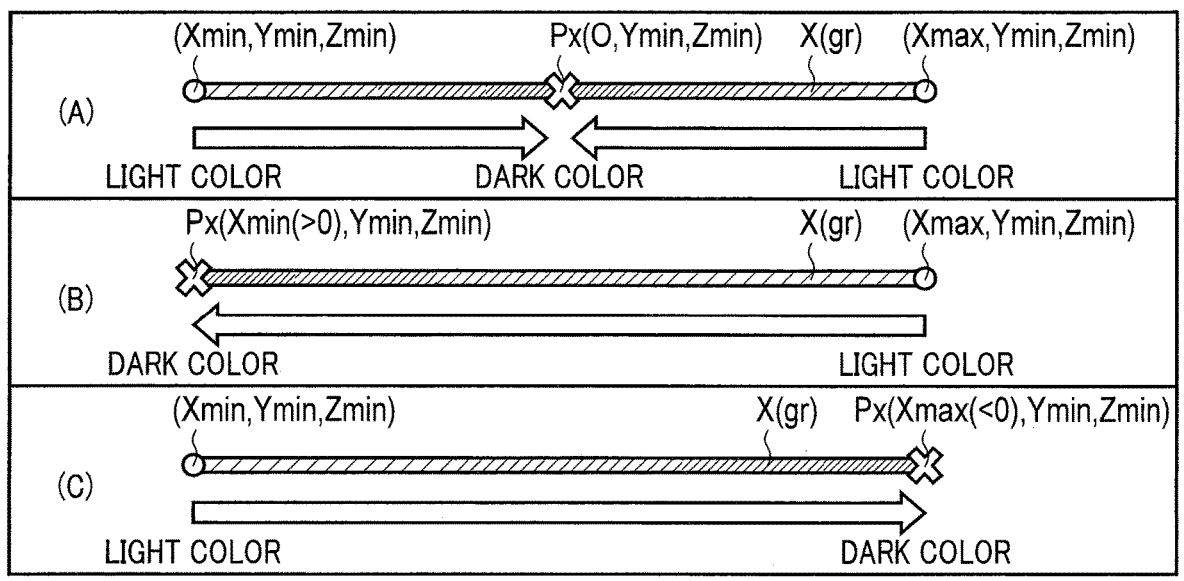
FIG. 4 is a view for describing first specific point relative position distinct display which is executed on the 3D space Ad by the 3D graph (figure) drawing function of the display apparatus 10.

FIG. 4 is a view for describing the first specific point relative position distinct display which is executed on the 3D space Ad by the 3D graph (figure) drawing function of the display apparatus 10.

Here, a description is given of, by way of example, the first specific point relative position distinct display which is executed with respect to the X-axis direction line X among the X-, Y- and Z-axis direction lines of the 3D space Ad.

The first specific point relative position distinct display is executed as gradation display gr such that the color becomes darker toward the origin O of the 3D space Ad and becomes lighter away from the origin O, with respect to the X-axis direction line X which is a side that constitutes the 3D space Ad.

Specifically, when the positional relationship between the 3D space Ad and the origin O satisfies Xmin<0<Xmax, as illustrated in part (A) of FIG. 4, such gradation display gr is executed that the color is darkest at a position Px (0, Ymin, Zmin) of "X=0" of the X-axis direction line X and the color becomes lighter toward both ends ((Xmin, Ymin, Zmin) and (Xmax, Ymin, Zmin)). When the positional relationship between the 3D space Ad and the origin O satisfies 0<Xmin, as illustrated in part (B) of FIG. 4, such gradation display gr is executed that the color is darkest at one end Px (Xmin (>0), Ymin, Zmin) of the X-axis direction line X and the color is lightest at the other end (Xmax, Ymin, Zmin)). When the positional relationship between the 3D space Ad and the origin O satisfies max<0, as illustrated in part (C) of FIG. 4, such gradation display gr is executed that the color is darkest at one end Px (Xmin (<0), Ymin, Zmin) of the axis X and the color is lightest at the other end (Xmin, Ymin, Zmin)).

In the display apparatus 10 (10F/10T) with the above-described configuration, the CPU 21 controls the operations of the respective circuitry components according to the instructions described in the 3D graph display control program 22a, and the software and hardware cooperate to realize a 3D graph (figure) drawing function which will be described in the following operational description.

Next, the operation of the display apparatus 10 (10F/10T) with the above-described configuration will be described.

FIG. 5 is a view illustrating examples of the (A) 3D space setup screen Gv, (B) origin display setup screen Gs, and (C) 3D graph expression input screen Gf, which are displayed according to the 3D graph (figure) drawing function of the display apparatus 10.

Figure 6:
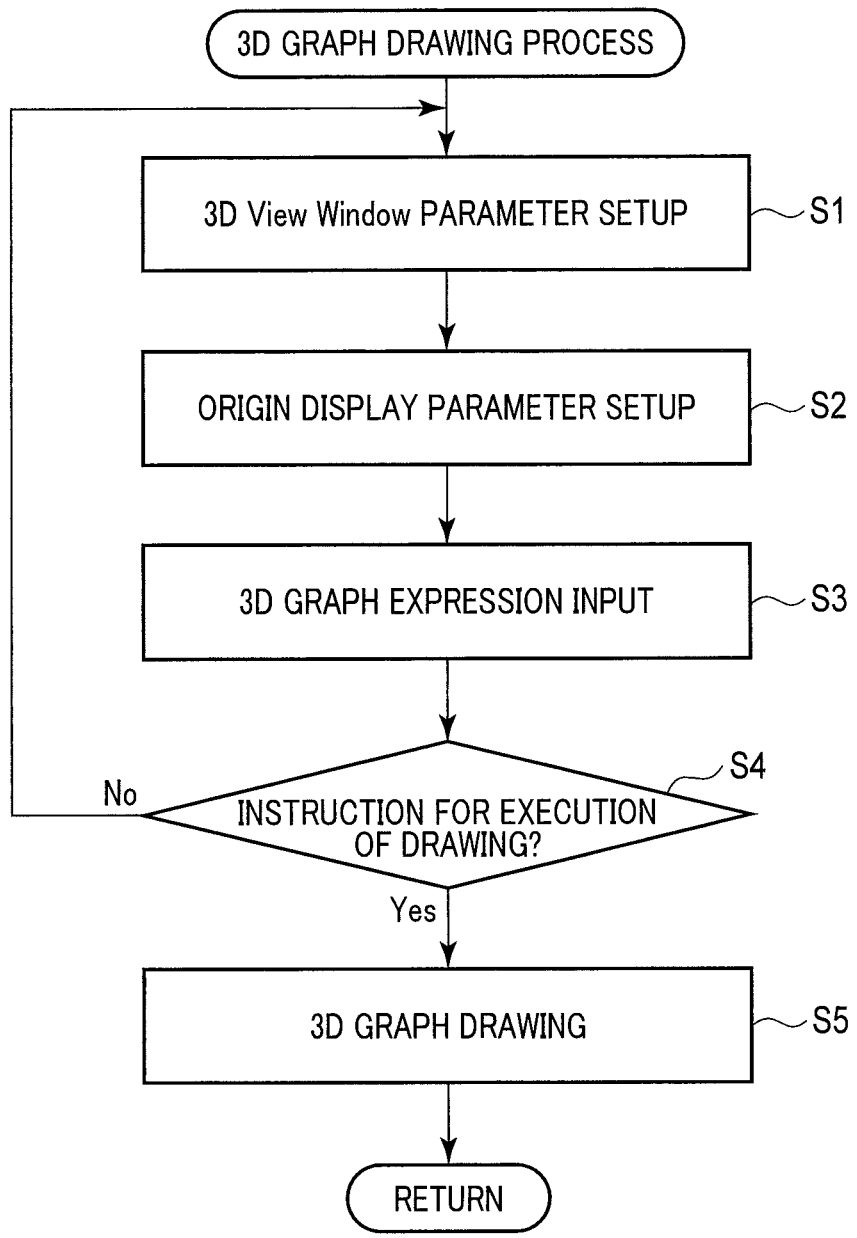
FIG. 6 is a flowchart illustrating a 3D graph (figure) drawing process of the display apparatus 10.

FIG. 6 is a flowchart illustrating a 3D graph (figure) drawing process of the display apparatus 10.

Figure 7A:
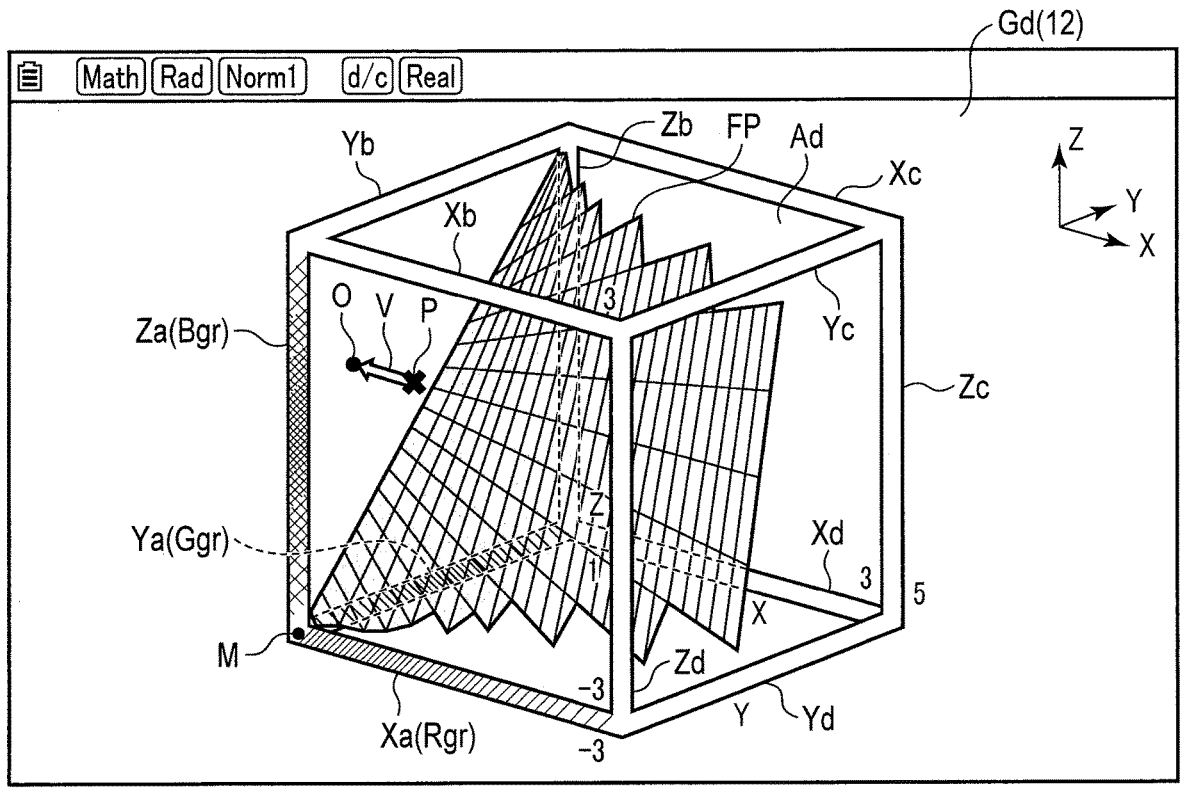
FIG. 7A is a view illustrating a display state of a 3D graph (figure) in a case where the position of the origin O of the 3D space Ad, which is set up according to the 3D graph (figure) drawing process of the display apparatus 10, is located in a plane sharing space.

FIG. 7A is a view illustrating a display state of a 3D graph (figure) in a case where the position of the origin O of the 3D space Ad, which is set up according to the 3D graph (figure) drawing process of the display apparatus 10, is located in a plane sharing space.

Figure 7B:
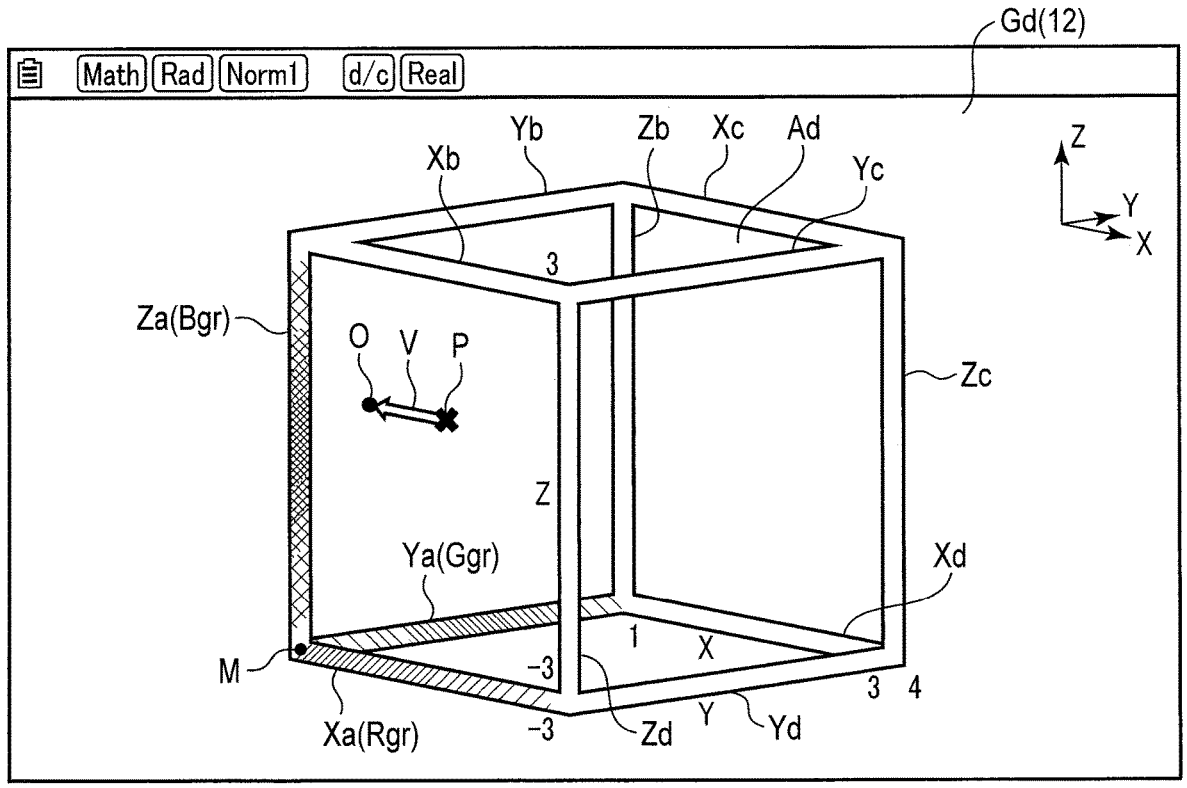
FIG. 7B is a view illustrating a display state of first to third specific point relative position distinct displays in the case where the position of the origin O of the 3D space Ad, which is set up according to the 3D graph (figure) drawing process of the display apparatus 10, is located in the plane sharing space.

FIG. 7B is a view illustrating a display state of the first to third specific point relative position distinct displays in the case where the position of the origin O of the 3D space Ad, which is set up according to the 3D graph (figure) drawing process of the display apparatus 10, is located in the plane sharing space.

On the 3D space setup screen Gv displayed on the display 12 in accordance with a user operation, as illustrated in part (A) of FIG. 5, if a 3D space Ad (Xmin, max/Ymin, max/Zmin, max) and a division number (grid) of grids (polygons), which are input in accordance with the user operation (or preset), are set up, the setup data of the 3D space Ad is stored in the V-Window data area 22b in the memory 22 (step S1).

Here, it is assumed that the 3D space Ad (Xmin~Xmax: 1~5, Ymin~Ymax: −3~3, Zmin~Zmax: −3~3) is set up.

On the origin display setup screen Gs displayed on the display 12 in accordance with a user operation, as illustrated in part (B) of FIG. 5, if the kind of specific point relative position distinct display (any one of the first to third specific point relative position distinct displays, or a combination thereof) is set up in accordance with the user operation (or is preset) (when the first specific point relative position distinct display is set up, the display colors of the X-axis direction line Xa, Y-axis direction line Ya and Z-axis direction line Za are also set up), the setup data for the specific point relative position distinct display is stored in the origin display setup data area 22d in the memory 22 (step S2).

Here, it is assumed that the combination of the three kinds, i.e. the first to third specific point relative position distinct displays, is set, and the display color of the X-axis direction line Xa is set to red R, the display color of the Y-axis direction line Ya is set to green G, and the display color of the Z-axis direction line Za is set to blue B.

On the 3D graph expression input screen Gf displayed on the display 12 in accordance with a user operation, as illustrated in part (C) of FIG. 5, if a freely selected graph expression (or a preset graph expression), which corresponds to the user operation, is input, the data of the input graph expression (here, "Z=XY") is stored in the 3D graph expression data area 22c in the memory 22 (step S3).

Then, if the execution of drawing of the 3D graph (figure) is instructed by the operation of the [EXE] key (step S4 (Yes)), a 3D graph screen Gd is displayed on the display 12 (step S5), as illustrated in FIG. 7A, based on the setup data of the 3D space Ad, which is read from the V-Window data area 22b, the setup data for specific point relative position distinct display, which is read from the origin display setup data area 22d, and the data "Z=XY" of the graph expression, which is read from the 3D graph expression data area 22c. On the 3D graph screen Gd, the following are drawn: the 3D space Ad, the first specific point relative position distinct display (red gradation display Rgr, green gradation display Ggr, blue gradation display Bgr), the second specific point relative position distinct display (origin direction mark P), the third specific point relative position distinct display (origin direction arrow V), and the 3D graph FP.

Specifically, based on the setup data of the 3D space Ad (Xmin~Xmax: 1~5, Ymin~Ymax: −3~3, Zmin~Zmax: −3~3), the 3D space (certain range) Ad is drawn, which is composed of X-axis direction lines Xa, Xb, Xc and Xd of the numerical range 1~5, Y-axis direction lines Ya, Yb, Yc and Yd of the numerical range −3~3, and Z-axis direction lines Za, Zb, Zc and Zd of the numerical range −3~3. In addition, based on the setup data for specific point relative position distinct display (the combination of the three kinds, i.e. the first to third specific point relative position distinct displays/ the X-axis direction Xa; red R, the Y-axis direction Ya; green G, and the Z-axis direction line Za; blue B), the following are drawn: the first specific point relative position distinct display (the red gradation display Rgr of the X-axis direction line Xa, green gradation display Ggr of the Y-axis direction line Ya, and blue gradation display Bgr of the Z-axis direction line Za), the second specific point relative position distinct display (the origin direction mark P that is the position at which a perpendicular line is dropped from the origin O onto the plane shared by the plane sharing space where the origin O is located and the 3D space Ad), and the third specific point relative position distinct display (the origin direction arrow V that is the vector indicative of the direction from the origin direction mark P toward the origin O). Further, based on the data "Z=XY" of the graph expression, the 3D graph FP corresponding to the graph expression "Z=XY" is drawn. Here, in FIG. 7A and FIG. 7B, since the origin O is present in the coordinate range which is displayable on the 3D graph screen Gd, the origin direction arrow V is expressed as an arrow having the origin direction mark P as a starting point and having the origin O as an end point. When the origin O is present outside the coordinate range which is displayable on the 3D graph screen Gd, the origin direction arrow V may be expressed as an arrow having the origin direction mark P as a starting point and extending in a direction of a straight line passing through the origin direction mark P and origin O, this arrow having, as an end point, a point in the coordinate range which is displayable on the 3D graph screen Gd.

Besides, FIG. 7B, like FIG. 7A, illustrates a case in which the position of the origin O of the 3D space Ad corresponds to the plane sharing pattern. In FIG. 7B, the depiction of the 3D graph FP is omitted, in order to make easier the view of the first specific point relative position distinct display (Rgr, Ggr and Bgr), the second specific point relative position distinct display (the origin direction mark P), and the third specific point relative position distinct display (the origin direction arrow V).

FIG. 8A is a view illustrating a display state of a 3D graph (figure) in a case where the position of the origin O of the 3D space Ad, which is set up according to the 3D graph (figure) drawing process of the display apparatus 10, is located in a side sharing space.

FIG. 8B is a view illustrating a display state of first to third specific point relative position distinct displays in the case where the position of the origin O of the 3D space Ad, which is set up according to the 3D graph (figure) drawing process of the display apparatus 10, is located in the side sharing space.

When the position of the origin O of the 3D space Ad is located in a side sharing space, the first specific point relative position distinct display is executed by red gradation display Rgr of the X-axis direction line Xa, green gradation display Ggr of the Y-axis direction line Ya, and blue gradation display Bgr of the Z-axis direction line Za, in which the colors become darker toward the origin O and become lighter away from the origin O. On the other hand, the second specific point relative position distinct display is executed by displaying, as a point indicative of the closest position to the origin O, the origin direction mark P that is the position at which a perpendicular line is dropped from the origin O onto the side (here, the Z-axis direction line Za) which is shared by the space where the origin O is located and the 3D space Ad. Further, the third specific point relative position distinct display is executed by displaying the origin direction arrow V that is the vector indicative of the direction from the origin direction mark P toward the origin O.

Here, in FIG. 8A and FIG. 8B, although the origin O is present in the coordinate range which is displayable on the 3D graph screen Gd, when the origin O is present outside the coordinate range which is displayable on the 3D graph screen Gd, the origin direction arrow V is expressed as an arrow having the origin direction mark P as a starting point and extending in a direction of a straight line passing through the origin direction mark P and origin O, this arrow having, as an end point, a point that is different from the origin O in the coordinate range which is displayable on the 3D graph screen Gd.

Besides, FIG. 8B, like FIG. 8A, illustrates a case in which the position of the origin O of the 3D space Ad corresponds to the side sharing pattern. In FIG. 8B, the depiction of the 3D graph FP is omitted, in order to make easier the view of the first specific point relative position distinct display (Rgr, Ggr and Bgr), the second specific point relative position distinct display (the origin direction mark P), and the third specific point relative position distinct display (the origin direction arrow V).

FIG. 9A is a view illustrating a display state of a 3D graph (figure) in a case where the position of the origin O of the 3D space Ad, which is set up according to the 3D graph (figure) drawing process of the display apparatus 10, is located in a point sharing space.

FIG. 9B is a view illustrating a display state of first to third specific point relative position distinct displays in the case where the position of the origin O of the 3D space Ad, which is set up according to the 3D graph (figure) drawing process of the display apparatus 10, is located in the point sharing space.

When the position of the origin O of the 3D space Ad is located in a point sharing space, the first specific point relative position distinct display is executed by red gradation display Rgr of the X-axis direction line Xa, green gradation display Ggr of the Y-axis direction line Ya, and blue gradation display Bgr of the Z-axis direction line Za, in which the colors become darker toward the origin O and become lighter away from the origin O. On the other hand, the second specific point relative position distinct display is executed by displaying, as a point indicative of the closest position to the origin O, the origin direction mark P that is the position at which a perpendicular line is dropped from the origin O onto the point (here, the vertex between the X-axis direction line Xa, Y-axis direction line Ya and Z-axis direction line Za) which is shared by the space where the origin O is located and the 3D space Ad. Further, the third specific point relative position distinct display is executed by displaying the origin direction arrow V that is the vector indicative of the direction from the origin direction mark P toward the origin O. Here, in FIG. 9A and FIG. 9B, like FIG. 8A and FIG. 8B, although the origin O is present in the coordinate range which is displayable on the 3D graph screen Gd, the origin direction arrow V is expressed as an arrow having the origin direction mark P as a starting point and extending in a direction of a straight line passing through the origin direction mark P and origin O, this arrow having, as an end point, a point that is different from the origin O in the coordinate range which is displayable on the 3D graph screen Gd.

Besides, FIG. 9B, like FIG. 9A, illustrates a case in which the position of the origin O of the 3D space Ad corresponds to the point sharing pattern. In FIG. 9B, the depiction of the 3D graph FP is omitted, in order to make easier the view of the first specific point relative position distinct display (Rgr, Ggr and Bgr), the second specific point relative position distinct display (the origin direction mark P), and the third specific point relative position distinct display (the origin direction arrow V).

Figure 10:
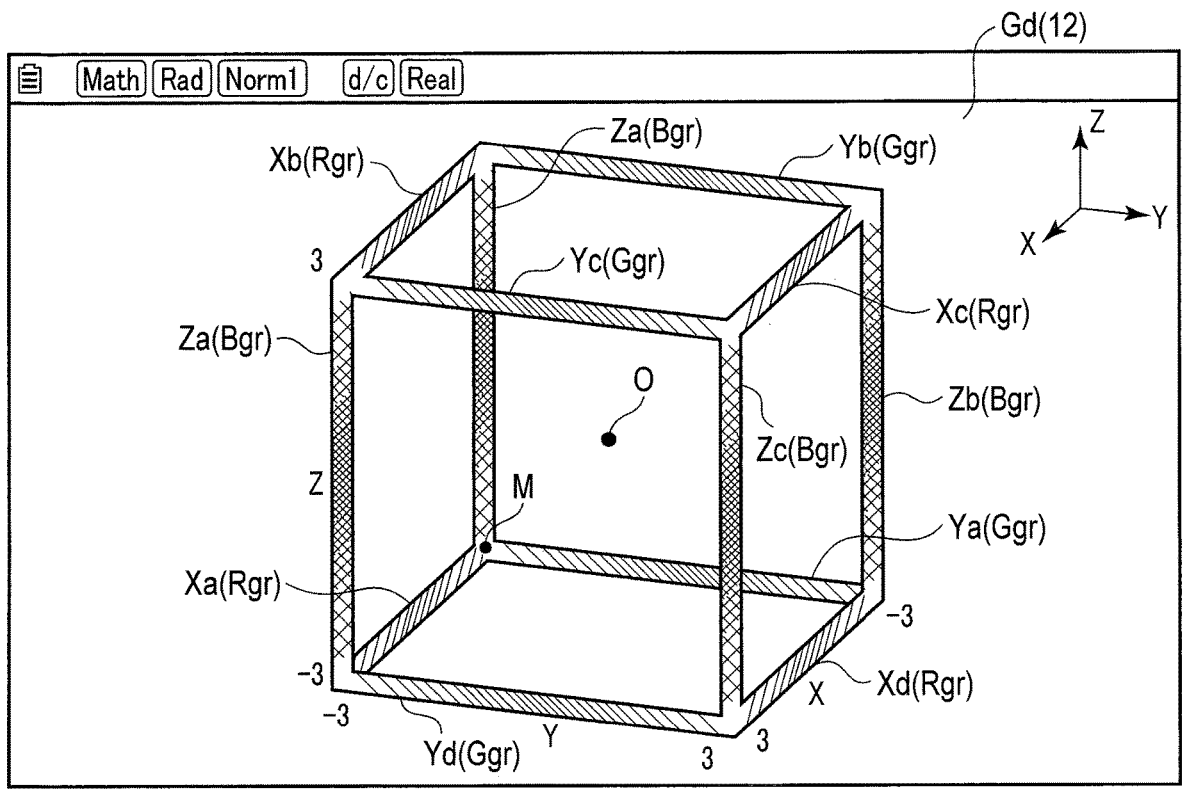
FIG. 10 is a view illustrating another example of the first specific point relative position distinct display with respect to the 3D space Ad which is set up according to the 3D graph (figure) drawing process of the display apparatus 10.

FIG. 10 is a view illustrating another example of the first specific point relative position distinct display with respect to the 3D space Ad which is set up according to the 3D graph (figure) drawing process of the display apparatus 10.

In the examples of the first specific point relative position distinct display described with reference to FIG. 1A, FIG. 1B, and FIG. 7A to FIG. 9B, among the twelve lines indicating the 3D space Ad (X-axis direction lines Xa, Xb, Xc and Xd, Y-axis direction lines Ya, Yb, Yc and Yd, and Z-axis direction lines Za, Zb, Zc and Zd), the display colors of red R, green G and blue B are allocated to the three lines (three-dimensional directions), i.e. the X-axis direction line Xa, Y-axis direction line Ya and Z-axis direction line Za, which have, as starting points, the 3D space minimum point M at which each of the X value, Y value and Z value becomes minimum, and the red gradation display Rgr, green gradation display Ggr and blue gradation display Bgr are executed such that the colors become darker toward the origin O and become lighter away from the origin O.

On the other hand, in another example of the first specific point relative position distinct display, as illustrated in FIG. 10, such a configuration may be adopted that the red gradation display Rgr is executed for all of the four X-axis direction lines Xa, Xb, Xc and Xd, the green gradation display Ggr is executed for all of the four Y-axis direction lines Ya, Yb, Yc and Yd, and the blue gradation display Bgr is executed for all of the four Z-axis direction lines Za, Zb, Zc and Zd, among the twelve lines indicative of the 3D space Ad.

According to this, the direction in which the origin O of the 3D space Ad is present can be expressed more clearly.

Besides, in order to make the depiction easily understandable, the another example shown in FIG. 10 illustrates a case in which the origin O of the 3D space Ad is located at the center in the 3D space Ad, i.e. a case of Xmin<0<Xmax, Ymin<0<Ymax, and Zmin<0<Zmax. Each of the X-axis direction lines Xa, Xb, Xc and Xd, Y-axis direction lines Ya, Yb, Yc and Yd, and Z-axis direction lines Za, Zb, Zc and Zd, is displayed such that the center has a dark color and both ends have light colors.

Figure 11:
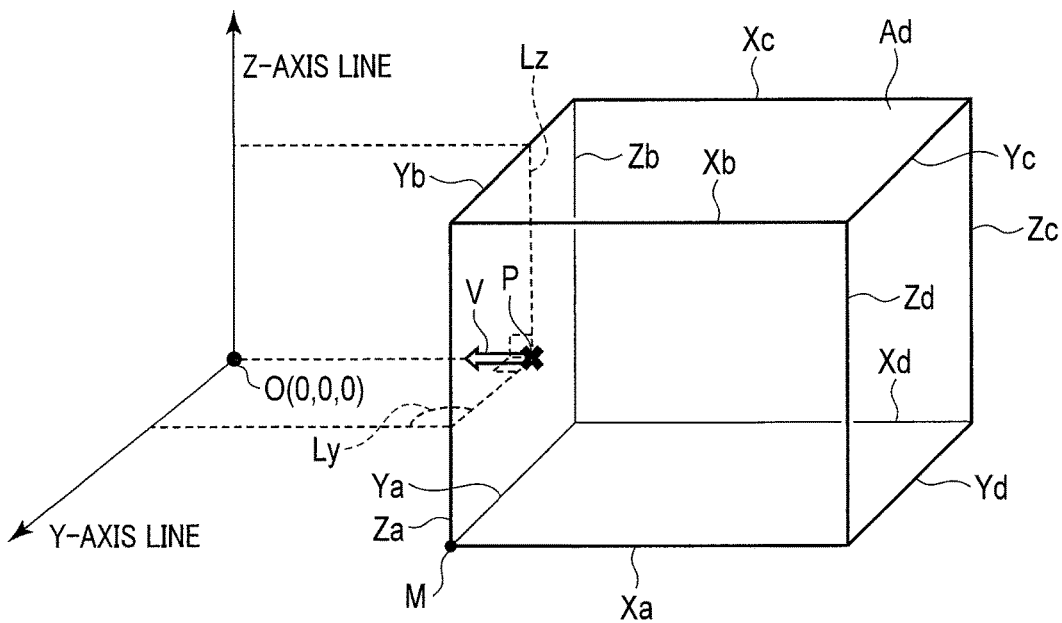
FIG. 11 is a view illustrating another example (part 1) of the second specific point relative position distinct display in the case where the position of the origin O relative to the 3D space Ad, which is set up according to the 3D graph (figure) drawing process of the display apparatus 10, is located in the plane sharing space.

FIG. 11 is a view illustrating another example (part 1) of the second specific point relative position distinct display in the case where the position of the origin O relative to the 3D space Ad, which is set up according to the 3D graph (figure) drawing process of the display apparatus 10, is located in the plane sharing space.

The example of the second specific point relative position distinct display described with reference to FIG. 1A, FIG. 1B, FIG. 7A and FIG. 7B has such configuration that when the position of the origin O relative to the 3D space Ad corresponds to the plane sharing pattern, the origin direction mark P indicative of the closest position to the origin O is displayed in red at the position at which a perpendicular line is dropped from the origin O onto the plane (here, the plane surrounded by the Y-axis direction lines Ya and Yb and Z-axis direction lines Za and Zb) which is shared by the space where the origin O is located and the 3D space Ad.

On the other hand, in the another example (part 1) of the second specific point relative position distinct display, as illustrated in FIG. 11, such a configuration may be adopted that, in addition to the origin direction mark P displayed on the plane shared by the space where the origin O is located and the 3D space Ad, mapping line segments Ly and Lz corresponding to positive parts (here, Y>0, and Z>0) of coordinate values of coordinate axes (here, Y-axis line and Z-axis line), which are parallel to the plane, are displayed by, for example, dotted lines.

According to this, the plane of the 3D space Ad, on which the origin direction mark P is displayed, can easily understandably be displayed, and the direction in which the origin O exists can be expressed more clearly. Furthermore, the positive directions of the coordinate axes in the 3D graph screen Gd become easier to understand.

Figure 12:
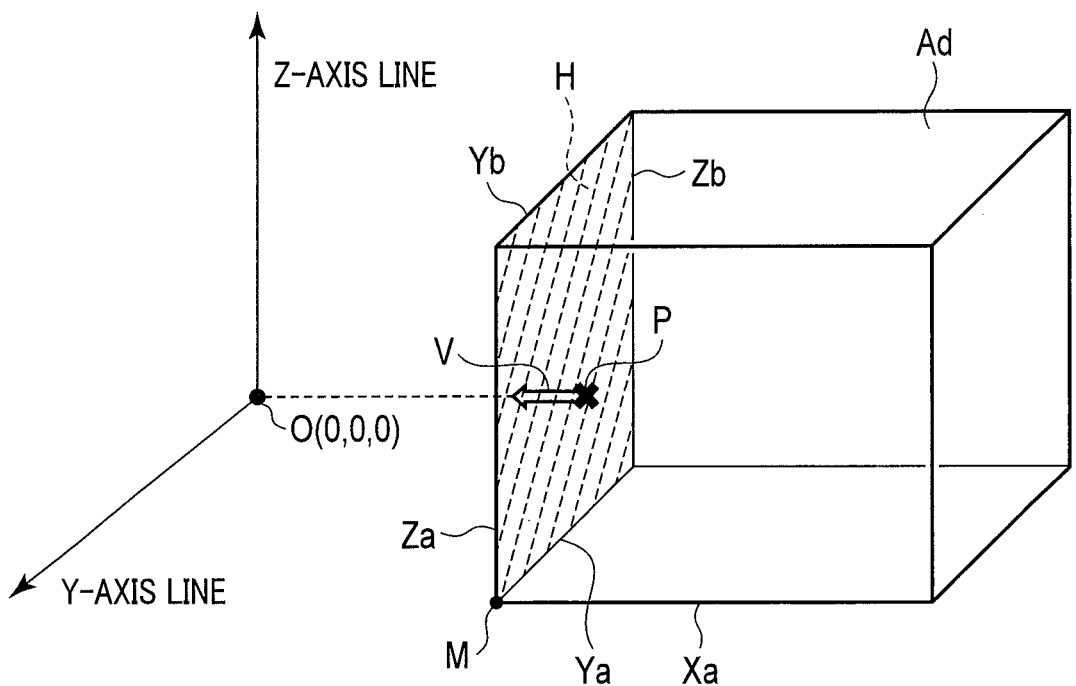
FIG. 12 is a view illustrating another example (part 2) of the second specific point relative position distinct display in the case where the position of the origin O relative to the 3D space Ad, which is set up according to the 3D graph (figure) drawing process of the display apparatus 10, is located in the plane sharing space.

FIG. 12 is a view illustrating another example (part 2) of the second specific point relative position distinct display in the case where the position of the origin O relative to the 3D space Ad, which is set up according to the 3D graph (figure) drawing process of the display apparatus 10, is located in the plane sharing space.

As illustrated in FIG. 12, in the another example (part 2) of the second specific point relative position distinct display, in addition to the origin direction mark P displayed on the plane shared by the space where the origin O is located and the 3D space Ad, distinct display H is effected, for example, by painting the plane itself in a light color, or by drawing dotted lines on the plane.

According to this, the plane of the 3D space Ad, on which the origin direction mark P is displayed, can more easily understandably be displayed, and the direction in which the origin O exists can be expressed more clearly.

Figure 13:
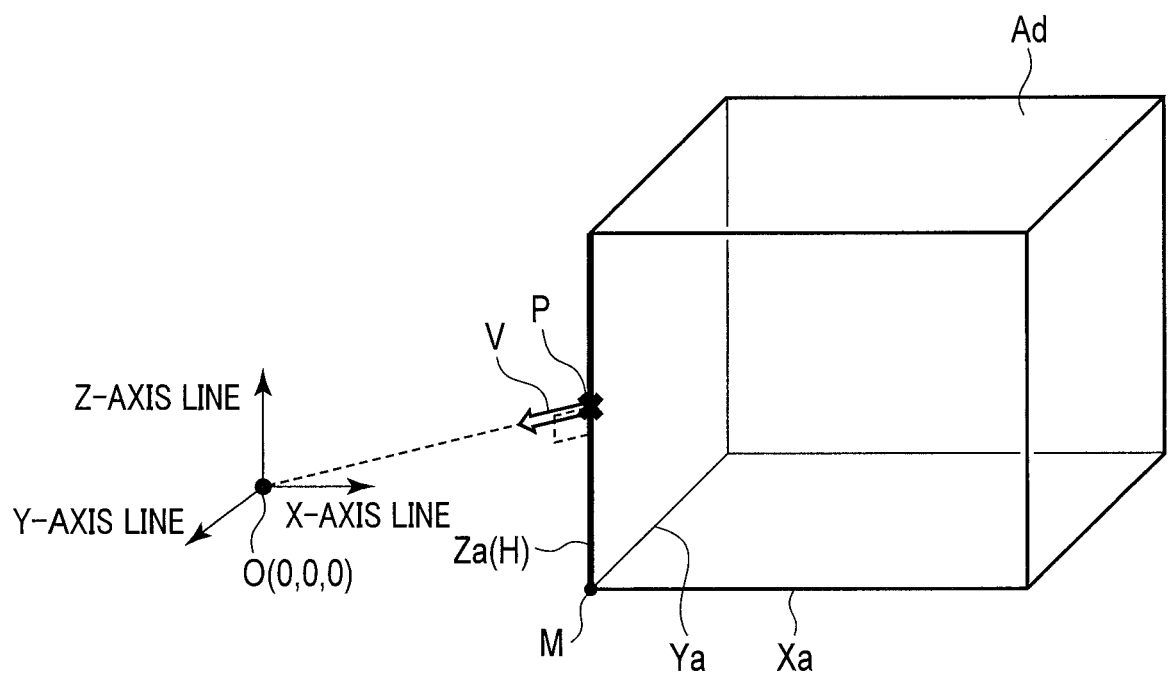
FIG. 13 is a view illustrating another example of the second specific point relative position distinct display in the case where the position of the origin O relative to the 3D space Ad, which is set up according to the 3D graph (figure) drawing process of the display apparatus 10, is located in the side sharing space.

FIG. 13 is a view illustrating another example of the second specific point relative position distinct display in the case where the position of the origin O relative to the 3D space Ad, which is set up according to the 3D graph (figure) drawing process of the display apparatus 10, is located in the side sharing space.

The example of the second specific point relative position distinct display described with reference to FIG. 8A and FIG. 8B has such configuration that when the position of the origin O relative to the 3D space Ad corresponds to the side sharing pattern, the origin direction mark P indicative of the closest position to the origin O is displayed in red at the position at which a perpendicular line is dropped from the origin O onto the side (here, Z-axis direction line Za) which is shared by the space where the origin O is located and the 3D space Ad.

On the other hand, in the another example of the second specific point relative position distinct display, as illustrated in FIG. 13, in addition to the origin direction mark P displayed on the side (here, Z-axis direction line Za) shared by the space where the origin O is located and the 3D space Ad, distinct display H is effected, for example, by expressing the side itself (Z-axis direction line Za) by a thicker line than the other sides.

According to this, the side of the 3D space Ad, on which the origin direction mark P is displayed, can easily understandably be displayed, and the direction in which the origin O exists can be expressed more clearly. Since it should suffice if the distinct display H can distinguish the side (Z-axis direction line Za), on which the origin direction mark P is present, from the other sides, the distinct display H may be effected by, aside from the thick line, flickering display of the side, or by drawing the side in a preset conspicuous color.

Thus, according to the 3D graph (figure) drawing function of the first embodiment of the display apparatus 10 with the above-described configuration, among the twelve lines indicating the 3D space Ad (X-axis direction lines Xa, Xb, Xc and Xd, Y-axis direction lines Ya, Yb, Yc and Yd, and Z-axis direction lines Za, Zb, Zc and Zd), the display colors of red R, green G and blue B are allocated to the three lines (three-dimensional directions), i.e. the X-axis direction line Xa, Y-axis direction line Ya and Z-axis direction line Za, which have, as starting points, the 3D space minimum point M at which each of the X value, Y value and Z value becomes minimum, and the red gradation display Rgr, green gradation display Ggr and blue gradation display Bgr (the first specific point relative position distinct display) are executed such that the colors become darker toward the origin O of the 3D space Ad and become lighter away from the origin O.

Thereby, even when the origin O (0, 0, 0) of the 3D space Ad, in which the 3D graph (figure) FP is drawn, is remote to the outside of the 3D space Ad or is remoter to the outside of the 3D graph screen Gd, the user can intuitively understand in which direction the origin O is present in relation to the 3D space Ad that is displayed on the screen.

Moreover, by executing the red gradation display Rgr, green gradation display Ggr and blue gradation display Bgr (the first specific point relative position distinct display), which indicate the direction of the origin O, for the three lines (three-dimensional directions), i.e. the X-axis direction line Xa, Y-axis direction line Ya and Z-axis direction line Za, which have, as starting points, the 3D space minimum point M of the 3D space Ad, the user can intuitively understand in which direction the origin O is present in relation to the 3D space Ad, even when the 3D graph (figure) drawing function is designed to be capable of rotating the 3D space Ad in all directions of 360° and when another vertex of the 3D space Ad is the 3D space minimum point M or each plane of the 3D space Ad is inclined.

Besides, according to the 3D graph (figure) drawing function of the first embodiment of the display apparatus 10 with the above-described configuration, when the origin O (0, 0, 0) relative to the 3D space Ad is present in an outside space (plane sharing space) which shares a plane with the 3D space Ad, the origin direction mark P (the second specific point relative position distinct display) indicative of the closest position to the origin O is displayed at the position at which a perpendicular line is dropped from the origin O onto the plane of the 3D space Ad, which is shared by the plane sharing space. In addition, when the origin O (0, 0, 0) relative to the 3D space Ad is present in an outside space (side sharing space) which shares a side with the 3D space Ad, the origin direction mark P (the second specific point relative position distinct display) indicative of the closest position to the origin O is displayed at the position at which a perpendicular line is dropped from the origin O onto the side of the 3D space Ad, which is shared by the side sharing space. Further, when the origin O (0, 0, 0) relative to the 3D space Ad is present in an outside space (point sharing space) which shares a vertex with the 3D space Ad, the origin direction mark P (the second specific point relative position distinct display) indicative of the closest position to the origin O is displayed at the point (vertex) of the 3D space Ad, which is shared by the point sharing space.

According to this, like the case of executing the first specific point relative position distinct display, the user can intuitively understand in which direction the origin O is present in relation to the 3D space Ad that is displayed on the screen.

Furthermore, according to the 3D graph (figure) drawing function of the first embodiment of the display apparatus 10 with the above-described configuration, even when the origin O (0, 0, 0) relative to the 3D space Ad is present in any one of the plane sharing space, side sharing space and point sharing space, the origin direction arrow V (the third specific point relative position distinct display) is displayed which is the vector indicative of the direction toward the origin O from the position of the plane, side or vertex, on which the origin direction mark P (the second specific point relative position distinct display) is displayed.

According to this, like the case of executing the first and second specific point relative position distinct displays, the user can intuitively understand in which direction the origin O is present in relation to the 3D space Ad that is displayed on the screen.

Second Embodiment

FIG. 14 is a view illustrating an example of specific point relative position distinct display with respect to a 3D space Ad corresponding to a 3D graph (figure) drawing function of a second embodiment of the display apparatus 10.

When the origin O (0, 0, 0) of the 3D space Ad is present in an outside space (a plane sharing space, or a side sharing space, or a point sharing space) of the 3D space Ad, as illustrated in FIG. 14, an origin direction arrow Vc, which indicates a direction from a central point Cp of the 3D space Ad toward the origin O, may be displayed.

In addition, when the origin O (0, 0, 0) of the 3D space Ad is present in the outside space (the plane sharing space, side sharing space, or point sharing space) of the 3D space Ad, as illustrated in FIG. 14, a line segment (corresponding to a distance to the origin O) L, which connects the central point Cp of the 3D space Ad and the origin O, may be displayed.

Further, when the origin O (0, 0, 0) of the 3D space Ad is present in the outside space (the plane sharing space, side sharing space, or point sharing space) of the 3D space Ad, as illustrated in FIG. 14, an origin direction arrow Vs indicative of a direction from a starting point Ps toward the origin O may be displayed, the point Ps being an intersection between a straight line connecting the central point Cp of the 3D space Ad and the origin O and a plane surrounded by the X-axis direction lines Xa and Xb and Z-axis direction lines Za and Zd. In the 3D graph (figure) drawing function of the second embodiment, by executing the above-described distinct display, such configuration can be implemented that, like the first embodiment, the positional relationship of the origin O to the 3D graph (figure) FP that is drawn in the 3D space Ad can be intuitively understood.

Third Embodiment

FIG. 15 is a view illustrating an example of specific point relative position distinct display with respect to a 3D space Ad corresponding to a 3D graph (figure) drawing function of a third embodiment of the display apparatus 10.

In the 3D graph (figure) drawing function of the third embodiment, even when the origin O (0, 0, 0) of the 3D space Ad is present in the 3D space Ad, the origin direction arrow Vc indicative of the direction from the central point Cp of the 3D space Ad toward the origin O is displayed, and thereby such configuration is implemented that the position of the origin O can intuitively be understood. Note that the display of the origin O may or may not be executed.

As has been described above, according to the 3D graph (figure) drawing functions of the first to third embodiments of the display apparatus 10, it is possible to intuitively understand the position of the origin O, in any of the embodiments, for example, even without displaying the names of axes or numerical scale values with respect to the X-axis direction lines (Xa, Xb, Xc and Xd), Y-axis direction lines (Ya, Yb, Yc and Yd) and Z-axis direction lines (Za, Zb, Zc and Zd) of the 3D space Ad.

In each of the above-described embodiments, the origin O (0, 0, 0) in the three-dimensional coordinate system is set as the specific point, and the relative position of the specific point to the 3D space (certain range) Ad in the three-dimensional coordinate system is displayed. However, the specific point is not limited to the origin O (0, 0, 0), and may be a freely chosen specific point S (Sx, Sy, Sz).

Concretely, when the specific point S (Sx, Sy, Sz)≠(0, 0, 0), the first specific point relative position display is executed as follows. To begin with, when Xmin<Sx<Xmax is satisfied, like part (A) of FIG. 4, such gradation display gr is executed that the color is darkest at a position Px (Sx, Ymin, Zmin) of "X=Sx" of the X-axis direction line X and the color becomes lighter toward both ends ((Xmin, Ymin, Zmin) and (Xmax, Ymin, Zmin)). When the relationship between the 3D space Ad and the origin O satisfies Sx<Xmin, like part (B) of FIG. 4, such gradation display gr is executed that the color is darkest at one end Px (Xmin (>Sx), Ymin, Zmin) of the X-axis direction line X and the color is lightest at the other end (Xmax, Ymin, Zmin). When the relationship between the 3D space Ad and the origin O satisfies Xmax<Sx, like part (C) of FIG. 4, such gradation display gr is executed that the color is darkest at one end Px (Xmax (<Sx), Ymin, Zmin) of the axis X and the color is lightest at the other end (Xmin, Ymin, Zmin).

In addition, when the specific point is S (Sx, Sy, Sz)≠(0, 0, 0), a specific point direction mark P can be displayed as second specific point direction distinct display, the specific point direction mark P being the position at which a perpendicular line is dropped from the specific position S onto a shared plane, a shared line or a shared point between the plane sharing space, line sharing space or point sharing space, where the specific point S exists, and the 3D space Ad.

Besides, when the specific point is S (Sx, Sy, Sz)≠(0, 0, 0), a specific point direction arrow V that is a vector indicative of the direction from the specific point direction mark P toward the specific point S can be displayed as third specific point direction distinct display.

In each of the above-described embodiments, the origin O (0, 0, 0) in the three-dimensional coordinate system is set as the specific point, and the relative position of the specific point to the 3D space (certain range) Ad in the three-dimensional coordinate system is displayed. However, the number of dimensions of the coordinate system may be one dimension or two dimensions.

Additionally, the methods of the respective processes by the display apparatus 10, which have been described in the above embodiments, that is, the methods for the 3D graph (figure) drawing process illustrated in the flowchart of FIG. 6 and the specific point relative position distinct display involved in the 3D graph (figure) drawing process can be stored as computer-executable programs in a medium of an external storage device, such as a memory card (ROM card, RAM card, etc.), a magnetic disk (floppy (trademark) disk, hard disk, etc.), an optical disc (CD-ROM, DVD, etc.), or a semiconductor memory, and can be distributed. In addition, the computer (CPU) of the electronic device including the display function reads the program, which is stored in the medium of the external storage device, into the storage device, and the operation is controlled by this read-in program. Thereby, it is possible to realize the 3D graph (figure) drawing function described in each of the embodiments, and to execute the same processes as by the above-described methods.

Additionally, the data of the program for realizing each of the above-described methods can be transmitted on a network (N) in the form of a program code, and the data of the program can be taken in the electronic device including the display function from a computer apparatus (program server) connected to this network (N), and stored in the storage device, thereby realizing the above-described 3D graph (figure) drawing function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus comprising:
a controller configured to cause a display to:
  effect display of a displayable coordinate range of a three-dimensional coordinate range system, wherein the three-dimensional coordinate range system is defined by three axes;
  effect display indicative of boundaries of a three-dimensional range, wherein the three-dimensional range is a portion of the displayable coordinate range;
  effect display of a three-dimensional graph figure within the boundaries of the three-dimensional range; and
  effect distinct display indicative of a relative position of a specific point in the displayable coordinate range to the boundaries of the three-dimensional range in the three-dimensional coordinate range system,
wherein the three-dimensional range is defined by a range of coordinate values of each of the three axes of the three-dimensional coordinate range system,
wherein the boundaries of the three-dimensional range are indicated by line segments,
wherein each of the line segments is indicative of at least one of an upper limit value and a lower limit value of the coordinate values of the each of the three axes, and
wherein the controller is configured to cause the display to effect the distinct display such that in the line segments, parts having different distances to the specific point or having different differences from a coordinate value of the specific point are visually different.

2. The display apparatus of claim 1,
wherein the specific point is an origin of the three-dimensional coordinate range system.

3. The display apparatus of claim 1,
wherein the controller is configured to cause the display to:
  effect display of rotation of the boundaries of the three-dimensional range in the three-dimensional coordinate range system; and
  effect the distinct display indicative of the relative position of the specific point in the displayable coordinate range to the boundaries of the three-dimensional range as the three-dimensional range is rotated.

4. The display apparatus of claim 1,
wherein the visually different distinct display in the line segments comprises display of color gradation of the line segments, where the color gradation becomes darker in the parts of the line segments closer to the specific point and the color gradation becomes lighter in the parts of the line segments further from the specific point.

5. A display apparatus comprising:
a controller configured to cause a display to:
  effect display of a displayable coordinate range of a three-dimensional coordinate range system, wherein the three-dimensional coordinate range system is defined by three axes;
  effect display indicative of boundaries of a three-dimensional range, wherein the three-dimensional range is a portion of the displayable coordinate range;
  effect display of a three-dimensional graph figure within the boundaries of the three-dimensional range; and
  effect distinct display indicative of a relative position of a specific point in the displayable coordinate range to the boundaries of the three-dimensional range in the three-dimensional coordinate range system,
wherein the three-dimensional range is defined by a range of coordinate values of each of the three axes of the three-dimensional coordinate range system,
wherein the boundaries of the three-dimensional range are indicated by line segments,
wherein each of the line segments is indicative of at least one of an upper limit value and a lower limit value of the coordinate values of the each of the three axes, and
wherein the controller is configured to cause the display to effect the distinct display in a manner to specify a part with a shortest distance from the specific point in any one of:
  the line segments;
  planes defined by the line segments; and
  vertices of a solid defined by the line segments.

6. The display apparatus of claim 5,
wherein the controller is configured to cause the display to effect the distinct display in a manner to specify a vector indicative of a direction from the part with a shortest distance toward the specific point.

7. The display apparatus according to claim 5,
wherein the specific point is an origin of the three-dimensional coordinate range system.

8. The display apparatus according to claim 5,
wherein the controller is configured to cause the display to:
  effect display of rotation of the boundaries of the three-dimensional range in the three-dimensional coordinate range system; and
  effect the distinct display indicative of the relative position of the specific point in the displayable coordinate range to the boundaries of the three-dimensional range as the three-dimensional range is rotated.

9. A display apparatus comprising:
a controller configured to cause a display to:
  effect display of a displayable coordinate range of a three-dimensional coordinate range system, wherein the three-dimensional coordinate range system is defined by three axes;
  effect display indicative of boundaries of a three-dimensional range, wherein the three-dimensional range is a portion of the displayable coordinate range;
  effect display of a three-dimensional graph figure within the boundaries of the three-dimensional range; and effect distinct display indicative of a relative position of a specific point in the displayable coordinate range to the boundaries of the three-dimensional range in the three-dimensional coordinate range system,
    wherein the controller is configured to cause the display to effect the distinct display to indicate at least one of:
        a direction of the specific point relative to the boundaries of the three-dimensional range; and
        a distance from any one of points in the boundaries of the three-dimensional range to the specific point.

10. The display apparatus according to claim 9,
wherein the specific point is an origin of the three-dimensional coordinate range system.

11. The display apparatus according to claim 9,
wherein the controller is configured to cause the display to:
    effect display of rotation of the boundaries of the three-dimensional range in the three-dimensional coordinate range system; and
    effect the distinct display indicative of the relative position of the specific point in the displayable coordinate range to the boundaries of the three-dimensional range as the three-dimensional range is rotated.

12. A display method comprising:
causing, by a controller of an electronic apparatus, a display to:
    effect display of a displayable coordinate range of a three-dimensional coordinate range system, wherein the three-dimensional coordinate range system is defined by three axes;
    effect display indicative of boundaries of a three-dimensional range, wherein the three-dimensional range is a portion of the displayable coordinate range;
    effect display of a three-dimensional graph figure within the boundaries of the three-dimensional range; and
    effect distinct display indicative of a relative position of a specific point in the displayable coordinate range to the boundaries of the three-dimensional range in the three-dimensional coordinate range system,
wherein the three-dimensional range is defined by a range of coordinate values of each of the three axes of the three-dimensional coordinate range system,
wherein the boundaries of the three-dimensional range are indicated by line segments,
wherein each of the line segments is indicative of at least one of an upper limit value and a lower limit value of the coordinate values of the each of the three axes, and
wherein causing the display to effect the distinct display comprises effecting the distinct display such that that in the line segments, parts having different distances to the specific point or having different differences from a coordinate value of the specific point are visually different.

13. The display method according to claim 12,
wherein the specific point is an origin of the three-dimensional coordinate range system.

14. The display method according to claim 12,
wherein causing the display to effect display indicative of the boundaries of the three-dimensional range comprises causing the display to effect display of rotation of the boundaries of the three-dimensional range in the three-dimensional coordinate range system, and
wherein causing the display to effect the distinct display comprises causing the display to effect the distinct display indicative of the relative position of the specific point in the displayable coordinate range to the boundaries of the three-dimensional range as the three-dimensional range is rotated.

15. The display method according to claim 12,
wherein the visually different distinct display in the line segments comprises display of color gradation of the line segments, where the color gradation becomes darker in the parts of the line segments closer to the specific point and the color gradation becomes lighter in the parts of the line segments further from the specific point.

16. A display method comprising:
causing, by a controller of an electronic apparatus, a display to:
    effect display of a displayable coordinate range of a three-dimensional coordinate range system, wherein the three-dimensional coordinate range system is defined by three axes;
    effect display indicative of boundaries of a three-dimensional range, wherein the three-dimensional range is a portion of the displayable coordinate range;
    effect display of a three-dimensional graph figure within the boundaries of the three-dimensional range; and
    effect distinct display indicative of a relative position of a specific point in the displayable coordinate range to the boundaries of the three-dimensional range in the three-dimensional coordinate range system,
wherein the three-dimensional range is defined by a range of coordinate values of each of the three axes of the three-dimensional coordinate range system,
wherein the boundaries of the three-dimensional range are indicated by line segments,
wherein each of the line segments is indicative of at least one of an upper limit value and a lower limit value of the coordinate values of the each of the three axes, and
wherein causing the display to effect the distinct display comprises causing the display to effect the distinct display in a manner to specify a part with a shortest distance from the specific point in any one of:
    the line segments;
    planes defined by the line segments; and
    vertices of a solid defined by the line segments.

17. The display method according to claim 16,
wherein causing the display to effect the distinct display comprises effecting the distinct display in a manner to specify a vector indicative of a direction from the part with a shortest distance toward the specific point.

18. The display method according to claim 16,
wherein the specific point is an origin of the three-dimensional coordinate range system.

19. The display method according to claim 16,
wherein causing the display to effect display indicative of the boundaries of the three-dimensional range comprises causing the display to effect display of rotation of the boundaries of the three-dimensional range in the three-dimensional coordinate range system, and
wherein causing the display to effect the distinct display comprises causing the display to effect the distinct display indicative of the relative position of the specific point in the displayable coordinate range to the boundaries of the three-dimensional range as the three-dimensional range is rotated.

20. A display method comprising:
causing, by a controller of an electronic apparatus, a display to:
- effect display of a displayable coordinate range of a three-dimensional coordinate range system, wherein the three-dimensional coordinate range system is defined by three axes;
- effect display indicative of boundaries of a three-dimensional range, wherein the three-dimensional range is a portion of the displayable coordinate range;
- effect display of a three-dimensional graph figure within the boundaries of the three-dimensional range; and
- effect distinct display indicative of a relative position of a specific point in the displayable coordinate range to the boundaries of the three-dimensional range in the three-dimensional coordinate range system, wherein causing the display to effect the distinct display comprises causing the display to effect the distinct display to indicate at least one of:
- a direction of the specific point relative to the boundaries of the three-dimensional range; and
- a distance from any one of points in the boundaries of the three-dimensional range to the specific point.

21. The display method according to claim 20,
wherein the specific point is an origin of the three-dimensional coordinate range system.

22. The display method according to claim 20,
wherein causing the display to effect display indicative of the boundaries of the three-dimensional range comprises causing the display to effect display of rotation of the boundaries of the three-dimensional range in the three-dimensional coordinate range system, and
wherein causing the display to effect the distinct display comprises causing the display to effect the distinct display indicative of the relative position of the specific point in the displayable coordinate range to the boundaries of the three-dimensional range as the three-dimensional range is rotated.

\* \* \* \* \*